US012531812B2

United States Patent
Li et al.

(10) Patent No.: US 12,531,812 B2
(45) Date of Patent: Jan. 20, 2026

(54) IP NETWORK QoS ENABLED BY APPLICATION CATEGORY DETECTION AND SESSION ASSOCIATION

(71) Applicant: Avago Technologies International Sales Pte. Limited, Singapore (SG)

(72) Inventors: Gordon Yong Li, San Diego, CA (US); Zibin Yu, Guangdong Province (CN); Peilong Xia, Beijing (CN); Xin Huang, Beijing (CN); Yunguang Tan, Beijing (CN)

(73) Assignee: Avago Technologies International Sales Pte. Limited, Singapore (SG)

( * ) Notice: Subject to any disclaimer, the term of this patent is extended or adjusted under 35 U.S.C. 154(b) by 149 days.

(21) Appl. No.: 18/497,957

(22) Filed: Oct. 30, 2023

(65) Prior Publication Data

US 2025/0016108 A1 Jan. 9, 2025

Related U.S. Application Data

(63) Continuation of application No. PCT/CN2023/103806, filed on Jun. 29, 2023.

(51) Int. Cl.
*H04L 47/2408* (2022.01)
*H04L 45/302* (2022.01)
(Continued)

(52) U.S. Cl.
CPC ........ *H04L 47/2475* (2013.01); *H04L 45/306* (2013.01); *H04L 45/745* (2013.01)

(58) Field of Classification Search
CPC . H04L 47/2475; H04L 47/2408; H04L 47/31; H04L 45/306; H04L 45/745
See application file for complete search history.

(56) References Cited

U.S. PATENT DOCUMENTS 7,289,442 B1 * 10/2007 Srinivasan .............. H04L 47/20
711/108
8,077,608 B1 * 12/2011 Arad ....................... H04L 47/10
370/467
(Continued)

FOREIGN PATENT DOCUMENTS

CN 101827084 A * 9/2010 ....... G06F 16/90344
CN 102201981 A * 9/2011
(Continued)

OTHER PUBLICATIONS

"Classification and Marking," Cisco CCNA 200-301 (v1.1) Complete Learning Path / Network Services for CCNA students / Classification and Marking. (Year: 2025).*
(Continued)

*Primary Examiner* — Alina A Boutah
(74) *Attorney, Agent, or Firm* — Foley & Lardner LLP

(57) ABSTRACT

The technical solutions can include a transmitter of a source device providing access to an application. The transmitter can be configured to detect a category of an application from a first packet to be transmitted from the source, determine a quality of service (QOS) for the application based on the category of the application, mark the first packet with a marker corresponding to the QoS and schedule transmission of the first packet based on the QoS to a destination device. The technical solutions can include a receiver of the destination device configured to identify the QoS set by the transmitter using the marker of the first packet received from the transmitter, mark a second packet to be transmitted from the destination device to the source device using the marker of the first packet, and schedule transmission of the second packet based at least on the QoS to the transmitter.

20 Claims, 9 Drawing Sheets

(51) Int. Cl.
*H04L 45/745* (2022.01)
*H04L 47/2475* (2022.01)
*H04L 47/31* (2022.01)

(56) References Cited

U.S. PATENT DOCUMENTS

| | | | | |
|---|---|---|---|---|
| 8,584,199 | B1* | 11/2013 | Chen | H04L 63/08 726/28 |
| 8,644,176 | B1* | 2/2014 | Shah | H04L 47/10 370/252 |
| 9,270,605 | B2* | 2/2016 | Izhak-Ratzin | H04L 69/22 |
| 9,860,166 | B1* | 1/2018 | Kwan | H04L 45/74 |
| 2004/0057437 | A1* | 3/2004 | Daniel | H04L 12/5601 370/395.43 |
| 2005/0114541 | A1* | 5/2005 | Ghetie | H04L 67/61 709/224 |
| 2005/0169253 | A1* | 8/2005 | Hu | H04L 47/2425 370/352 |
| 2008/0020775 | A1* | 1/2008 | Willars | H04W 72/569 455/445 |
| 2009/0147788 | A1* | 6/2009 | Lee | H04L 47/2433 370/392 |
| 2012/0042060 | A1* | 2/2012 | Jackowski | H04L 67/025 709/224 |
| 2013/0058214 | A1* | 3/2013 | Foglar | H04L 41/5022 370/230.1 |
| 2014/0105017 | A1* | 4/2014 | Pappas | H04L 12/4662 370/231 |
| 2014/0136718 | A1* | 5/2014 | Menezes | H04L 47/2441 709/227 |
| 2015/0016299 | A1* | 1/2015 | Zhang | H04L 67/14 370/253 |
| 2015/0222489 | A1 | 8/2015 | Perez Martinez et al. | |
| 2015/0350094 | A1* | 12/2015 | Izhak-Ratzin | H04L 47/2441 370/235 |
| 2017/0245170 | A1* | 8/2017 | Henry | H04W 28/0268 |
| 2019/0082360 | A1* | 3/2019 | Henry | H04W 36/0016 |
| 2019/0097920 | A1* | 3/2019 | Han | H04L 69/325 |
| 2019/0190834 | A1* | 6/2019 | Sung | H04L 43/0858 |
| 2020/0145953 | A1* | 5/2020 | Youn | H04W 60/04 |
| 2021/0075733 | A1* | 3/2021 | Szigeti | H04L 47/2425 |
| 2022/0368640 | A1* | 11/2022 | Wheelock | H04L 12/4633 |

FOREIGN PATENT DOCUMENTS

| | | | | |
|---|---|---|---|---|
| CN | 102547610 | A | | 7/2012 |
| CN | 104641616 | A * | 5/2015 | ......... H04L 29/0653 |
| CN | 105704058 | A * | 6/2016 | ............ H04L 47/10 |
| CN | 103250391 | B * | 10/2016 | ......... H04L 47/2441 |
| CN | 107534619 | A * | 1/2018 | ............ H04L 1/0018 |
| CN | 113114573 | A * | 7/2021 | |
| CN | 115277583 | A | 11/2022 | |
| CN | 115699700 | A | 2/2023 | |
| CN | 115866673 | A * | 3/2023 | ............ H04W 28/02 |
| EP | 2712130 | A1 * | 3/2014 | ......... H04L 47/2433 |
| EP | 2824951 | A1 * | 1/2015 | ......... H04L 12/1407 |
| EP | 2648429 | B1 * | 7/2017 | ............ H04L 47/24 |
| EP | 3376718 | A1 * | 9/2018 | ............ H04L 47/2408 |
| WO | WO-2011029913 | A1 * | 3/2011 | ............ H04L 12/4625 |
| WO | WO-2021080652 | A1 * | 4/2021 | ............ H04L 47/22 |
| WO | WO-2023213091 | A1 * | 11/2023 | ............ H04L 47/20 |
| WO | WO-2024021896 | A1 * | 2/2024 | ............ H04L 45/302 |

OTHER PUBLICATIONS

"QoS Marking: How, Where, and Why," Unadulerted Nerdery, Mar. 27, 2014. (Year: 2014).*

Sanneck et al., "Efficient QoS Support for Voice-over-IP Applications Using Selective Packet Marking," First International Workshop on Intelligent Multimedia Computing and Networking (IMMCN 2000), Atlantic City, Feb. 2000 (Year: 2000).*

International Search Report and Written Opinion on PCT AppIn No. PCT/CN2023/103806, dated Dec. 6, 2023 (6 pages).

* cited by examiner

IP NETWORK QoS ENABLED BY APPLICATION CATEGORY DETECTION AND SESSION ASSOCIATION

CROSS-REFERENCE TO RELATED PATENT APPLICATIONS

This application claims the benefit of priority under 35 U.S.C. § 120 as a continuation of International Patent Cooperation Treaty (PCT) Application No.: PCT/CN2023/103806, filed on Jun. 29, 2023, which is incorporated herein by reference in its entirety and for all purposes.

TECHNICAL FIELD

This disclosure generally relates to systems and methods for Quality of Service (QOS) for Internet Protocol (IP) networks, and in particular QoS based on categories of applications.

BACKGROUND

QoS in IP networks can be applicable across different network types, such as Wireless Fidelity (Wi-Fi) networks, Data Over Cable Service Interface Specifications (DOCSIS) networks, Digital Subscriber Line (DSL) or Passive Optical Network (PON), and using devices like modems, gateways, and set-top boxes. In IP networks, QoS can be facilitated using static network configurations for communicating network traffic in various implementations.

SUMMARY

The technical solutions of the present disclosure utilize a source side receiver to identify and mark network packets for upstream and downstream QoS service and delivery based on categories of applications generating the packets. Implementing QoS can be challenging due to resource-intensive inspection of network packets and rigid rules that QoS solutions can use. Technical solutions of the present disclosure overcome these challenges by using multi-stage processing for specific packets in application sessions, categorizing IP network traffic-generating applications via dynamic packet inspection to produce results more quickly and fewer computing and network services. The technical solutions can detect categories of the application upstream network traffic packets, and based on the category of the application, insert markers into the upstream packets to indicate a specific type of QoS service to be provided to the packets. On the destination side, markers can be extracted from the incoming upstream packets and can be inserted into downstream packets, maintaining consistent QoS service on both upstream and downstream communication in a dynamic, flexible, quick and compute efficient manner.

An aspect of the technical solutions is directed to a system that can include a transmitter of a source device providing access to an application. The transmitter can be configured to detect a category of an application from a first packet to be transmitted from the source device. The transmitter can be configured to determine a quality of service (QOS) for the application based at least on the category of the application. The transmitter can be configured to mark the first packet with a marker corresponding to the QoS and schedule transmission of the first packet based at least on the QoS to a destination device. The system can include a receiver of the destination device. The receiver can be configured to identify the QoS set by the transmitter using the marker of the first packet received from the transmitter. The receiver can be configured to mark a second packet to be transmitted from the destination device to the source device using the marker of the first packet. The receiver can be configured to schedule transmission of the second packet based at least on the QoS to the transmitter.

The transmitter can be configured to parse a payload of an application of the first packet and detect the category of the application according to the identified portion of the payload. The transmitter can be configured to parse a header of a packet for establishing a secured connection between the source device and the destination device. The transmitter can be configured to detect the category of the application according to the header.

The transmitter can be configured to identify an attribute of a session of the application and form the marker indicative of the attribute. The transmitter can be configured to insert the marker into a header of a network layer of the first packet. The marker can be configured to cause a network routing the first packet between the transmitter and the receiver to provide the QoS processing to the first packet according to the attribute.

The receiver can be configured to parse a header of a network layer of the first packet. The receiver can be configured to identify the QoS based at least on the marker in the header. The receiver can be configured to insert the marker into a header of a network layer of the second packet to cause a network routing the first packet between the receiver and the transmitter to provide the QoS processing to the second packet according to an attribute of a session of the application determined by the transmitter. The receiver can be configured to identify a session according to the first packet. The receiver can be configured to transmit the second packet of the identified session according to a schedule determined based at least on the QoS set by the transmitter.

An aspect of the technical solutions is directed to a system comprising a receiver of a destination device. The receiver can be configured to receive a packet transmitted from a source device based at least on a quality of service (QOS) set by the source device. The receiver can be configured to identify a marker of a first packet and identify the QoS set by the source device based at least on the marker. The receiver can be configured to mark a second packet to be transmitted from the receiver to the source device using the marker of the first packet. The receiver can be configured to schedule transmission of the second packet based at least on the QoS determined based at least on the marker.

The receiver can be configured to identify the marker from a header of a network layer of the first packet. The receiver can be configured to detect a session of the first packet according to the marker. The receiver can be configured to select for marking the second packet of the session. The receiver can be configured to parse a header of a network layer of the first packet; and identify the QoS for the first packet and the second packet based at least on the marker in the header.

The receiver can be configured to identify an application of the transmitter of the first packet and select for marking the second packet of an application of the receiver corresponding to the application of the transmitter. The system can include at least one of the application of the transmitter or the application of the receiver that includes a video conferencing application or a gaming application.

An aspect of the technical solution is directed to a method. The method can include detecting, by a transmitter of a source device providing access to an application, a category of an application from a first packet to be transmitted from the source device. The method can include determining, by the transmitter, a quality of service (QOS) for the application based at least on the category of the application. The method can include marking, by the transmitter, the first packet with a marker corresponding to the QoS. The method can include scheduling, by the transmitter, transmission of the first packet based at least on the QoS to a destination device. The method can include identifying, by a receiver of the destination device, the QoS set by the transmitter using the marker of the first packet received from the transmitter. The method can include marking, by the receiver, a second packet to be transmitted from the destination device to the source device using the marker of the first packet. The method can include scheduling, by the receiver, transmission of the second packet based at least on the QoS to the transmitter.

The method can include parsing, by the transmitter, a payload of an application of the first packet and detecting, by the transmitter, the category of the application according to the identified portion of the payload. The method can include parsing, by the transmitter, a header of a packet for establishing a secured connection between the source device and the destination device and detecting, by the transmitter, the category of the application according to the header.

The method can include identifying, by the transmitter, an attribute of a session of the application. The method can include forming, by the transmitter, the marker indicative of the attribute. The method can include inserting, by the transmitter, the marker into a header of a network layer of the first packet, wherein the marker is configured to cause a network routing the first packet between the transmitter and the receiver to provide the QoS processing to the first packet according to the attribute.

The method can include parsing, by the receiver, a header of a network layer of the first packet. The method can include identify the QoS based at least on the marker in the header. The method can include inserting, by the receiver, the marker into a header of a network layer of the second packet to cause a network routing the first packet between the receiver and the transmitter to provide the QoS processing to the second packet according to an attribute of a session of the application determined by the transmitter. The method can include identifying, by the receiver, a session according to the first packet and transmitting, by the receiver, the second packet of the identified session according to a schedule determined based at least on the QoS set by the transmitter.

The method can include identifying, by the transmitter, a third packet of a first session of the source device corresponding to the first packet. The method can include marking, by the transmitter responsive to the identifying, the third packet with the marker. The method can include scheduling, by the transmitter, transmission of the third packet based at least on the QoS. The method can include identifying, by the receiver, a fourth packet of a second session of the destination device. The method can include marking, by the receiver, the fourth packet to be transmitted from the destination device to the source device using the marker of the third packet. The method can include scheduling, by the receiver, transmission of the fourth packet based at least on the QoS.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Figure 1:
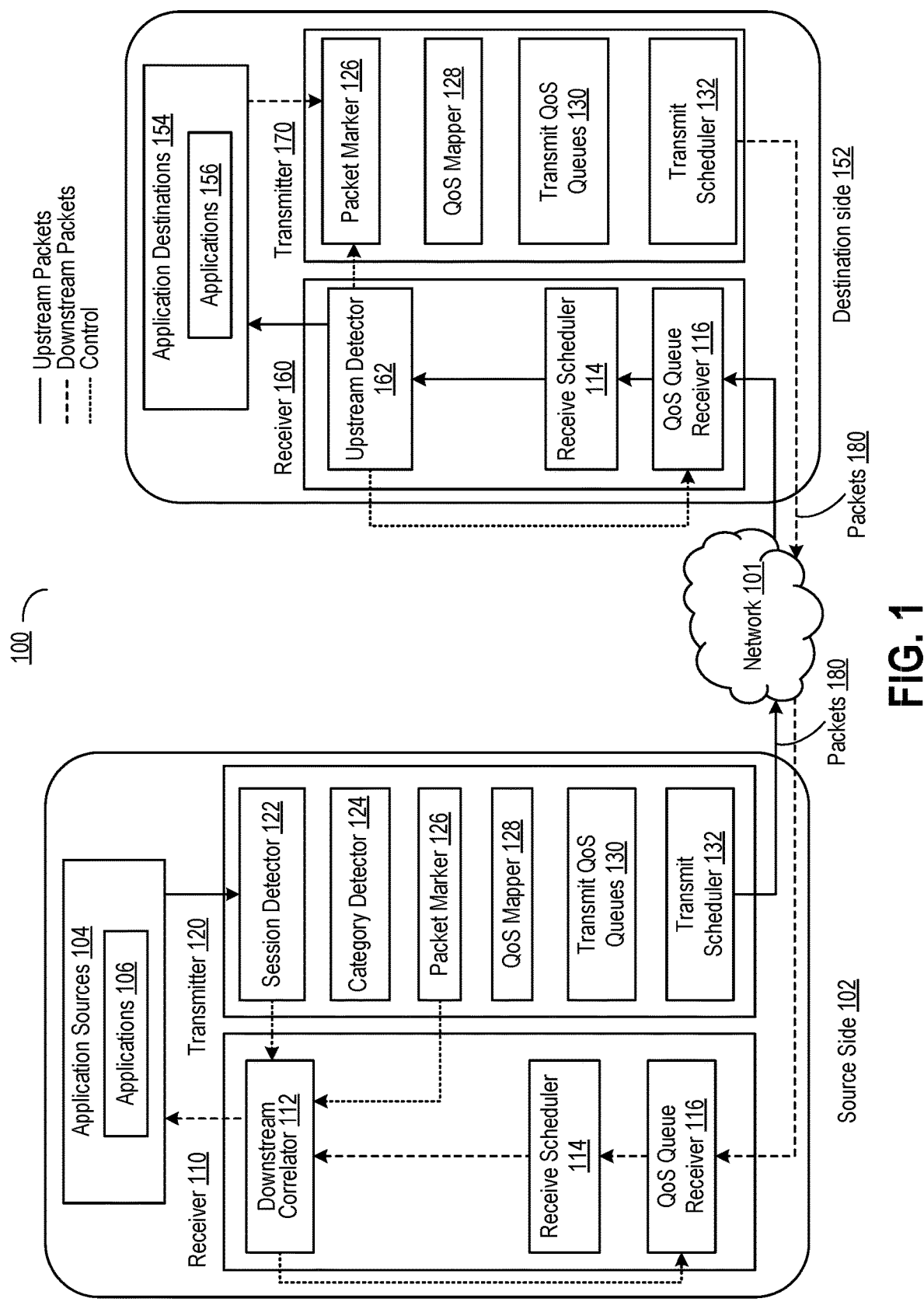
FIG. 1 is an example block diagram of a system for application category detection and marking of packets for upstream and downstream QoS service and delivery.

The present embodiments shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in software should not be limited to such implementation alone, but they can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The technical solutions of the present disclosure identify application categories of application-specific packets at the source side to mark the packets for upstream and downstream QoS service and delivery. As various applications can use network traffic for different purposes, desired QoS for different applications can widely vary. Systems providing QoS to the network traffic can be set to satisfy different levels or types of network performance, such as specific levels or ranges of latency, bandwidth, throughput or security. However, providing QoS to applications having different desired performances can be challenging as detailed inspection of each of the network packets traversing the network devices can be computationally and network resource intensive. In addition, since QoS systems can utilize rigid rules, it can be difficult to dynamically adjust the QoS processing of different packets to improve the efficiency or performance of the service.

The technical solutions of the present disclosure overcome such challenges by efficiently analyzing select packets of an application session to detect the category of the application in order to set the QoS for the IP network traffic. The processing of the select network packets can rely on a dynamic packet inspection, resulting in faster and more computationally efficient results, rather than the static in depth packet inspection. For instance, once an application category is detected, the upstream source side network packet can be marked with a marker indicative of QoS service for the QoS capable network and the destination side devices. On the destination side, the marker can be detected by the destination side receiver and used to mark the downstream packet of the same session destined for the source side. In doing so, the technical solutions can provide the same QoS service to one or more downstream and upstream communications based on a single packet detection and analysis, thereby saving computational and network resources, while improving the QoS service.

Quality of Service (QOS) can include any set of solutions (e.g., techniques and mechanisms) for prioritizing, managing and delivering network traffic in accordance with levels of service suitable for different applications and services. The technical solutions can classify application categories according to QoS settings or preferences for such application category, such as a given latency, throughput or security range or parameters, acceptable level of packet loss, priority or rate limits. In doing so, the technical solutions can facilitate or provide appropriate or desired QoS services for given types of applications, such as video conferencing, video gaming, live streaming, virtual or augmented reality, or other applications. Application category detection can be utilized by the source device to dynamically mark (e.g., with differentiated services code point or DSCP) the packets in the upstream direction, based on the detected application session attributes. Detected application session attributes can include application categories, such as start or end of the session, bandwidth variations, inter-packet interval statistics or parameters, and similar. The session attributes or their indicators (e.g., values or codes indicative of the specific attributes) can be dynamically inserted into packets as markers that convey the corresponding QoS settings or preferences, mapping the dynamic markers in packets into appropriate QoS queues for upstream transmission.

On the destination side, the destination receiver can correlate and associate the downstream packets with the corresponding received upstream packets and can apply the corresponding QoS to the Receive QoS Queues. On the destination device, the received marked upstream packets can be correlated and associated with the corresponding downstream packets (e.g., of the same session). The downstream packets can use the same marker as the upstream packets so that they can be marked with the same QoS on the downstream transmissions. The destination device can map the dynamic markers in downstream packets into appropriate QoS queues for downstream transmission and transmit them accordingly.

For IP networks, the traditional approach of QoS servicing can include static network configuration and/or fixed packet marking by the applications generating IP traffic. Example IP networks can include Wi-Fi network, DOCSIS access network, DSL/PON access network, and core IP network, which can include devices, such as cable/DSL/PON modems and residential gateways, IP set top boxes (STBs). The technical solutions of the present disclosure allow a source device (e.g., SoC) to detect the categories of the applications generating network using detection techniques for a select set of packets associated with the given application sessions. The processing of the select packets can include a dynamic packet inspection, avoiding a static in-depth inspection of QoS systems, thus providing an improved computational efficiency. The network packets can be marked according to the QoS parameters of the detected application categories, causing the network devices implementing the QoS to process the network packets of the given session in accordance with the marking.

A session can include any period of interaction or communication between a source side 102 and a destination side 152. For instance, session between a source side 102 and a destination side 152 can include any exchange of data packets 100 via upstream and/or downstream transmissions between the source and destination sides. During this interaction, packets 180 can be transmitted from the source to the destination (e.g., upstream) and from the destination back to the source (e.g., downstream), such that it is subject to encryption or QoS operations, based on the nature, settings or preferences of the applications involved.

An attribute of a session can include any characteristic or feature of a specific aspect of the session between the source side 102 and destination side 152, based at least on the type of the applications involved. The technical solutions can include the source device, or its transmitter or intermediary device, dynamically marking (e.g., with DSCP) the packets in the upstream direction, according to the session attributes of the detected applications. The session attributes can include application categories, start/end of the session, bandwidth or latency ranges or variations, inter-packet interval statistics, and other QoS related information or data. The session attributes can be dynamically mapped using packet markers that can be indicative of, or can convey, the given QoS requirements. The source device can map the dynamic markers in upstream packets into appropriate QoS queues for upstream transmission.

For the downstream packets, the source device can correlate and associate the downstream packets with the corresponding upstream packets (e.g., of the same session), and apply the corresponding QoS to the QoS queue receiver. On the destination device (e.g., SoC) side, the marked upstream can be correlated and associated with the corresponding downstream. The packets of the associated downstream can be marked with the consistent markers as the upstream (e.g., the same session or connection). The destination device can map the dynamic markers in downstream packets into appropriate QoS queues for downstream transmission. The disclosed solution can relate to detection of application categories and mapping of the detection results to the packet marking. Packet markings can be present and detectable in the transmitted packets.

FIG. 1 illustrates a system 100 for application category detection and marking of packets for upstream and downstream QoS service and delivery. System 100 can include any combination of hardware and software for marking network packets 180 for QoS processing according to categories of applications 106 and/or 156. System 100 can include a QoS enabled IP network of one or more computing devices configured to support various QoS mechanisms for packet 180 transmission, processing and delivery.

System 100 can include one or more source sides 102 communicating network packets 180, via one or more networks 101, with one or more destination sides 152. Source side 102 can include a grouping of one or more computing devices (e.g., user devices, smart phones, cable modems, routers, STBs or any other devices capable of data processing and/or network communication). Destination side 152 grouping of one or more computing devices (e.g., servers, virtual private networks, virtual machines or cloud as a service functionality).

Source side 102 can include one or more application sources 104 (e.g., user computing devices) executing one or more applications 106. Source side 102 can include one or more receivers 110 and transmitters 120. Receiver 110 can include one or more downstream correlators 112, receive schedulers 114 and QoS queue receivers 116. Transmitter 120 can include one or more session detectors 122, category detectors 124, packet markers 126, QoS mappers 128, transmit QoS queues 130 and transmit schedulers 132.

Destination side can include one or more application destinations 154 (e.g., servers) executing applications 156 exchanging network traffic with application sources 106 from application sources 106 on the source side 102. Destination side 152 can include one or more receivers 160 and transmitters 170. Receiver 160 can include one or more upstream detectors 162, receive schedulers 114 and QoS queue receivers 116. Transmitter 170 can include one or more packet markers 126, QoS mappers 128, transmit QoS queues 130 and transmit schedulers 132.

Network 101 can include any network for facilitating packet 180 transmissions or communications between the source side 102 and destination side 152. Network 101 can be configured to facilitate QoS processing for packets 180. Network 101 can include a cellular network, having base stations and processing functions for 4G, 5G or 6G cellular communication. Network 101 can include 802.11e capable Wi-Fi network, LLD capable DOCSIS access network, DSL/PON access network, and core IP network, etc.

The network devices (e.g., on one or more networks 101) can include variety of computing devices, such as cable/DSL/PON modems/headends, residential gateways, IP STBs, etc. The designation of source side 102 and destination side 152 devices on the network 101 can be application specific. For instance, on a DOCSIS access network, a cable modem (CM) device can be designated as the source device (e.g., application source 104) and the cable modem termination system (CMTS) as the destination device (e.g., application destination 154). For instance, on a Wi-Fi network 101, the Wi-Fi clients (e.g., user devices) can be designated as the source devices (e.g., application source 104), and the Wi-Fi access point can be designated as the destination device (e.g., application destination 154). It is understood that application sources 104 and application destinations 154 are illustrated as examples and may be arbitrary, different or reversed.

Application source 104, also referred to as a source device, can include any computing device using, running or executing an application 106 that can generate or communicate network packets 180 across a network 101. Application source 104 (e.g., source device) can include, for example, a system on a chip (SoC) for a router or a set top box. Application source 104 can include a user device, such as a computer, a tablet, smart phone or a gaming console, exchanging network packets 180 with a remote application 156 at an application destination 154 (e.g., a server or a cloud service). Application source 104 can include the receiver 110 and transmitter 120 as an integrated single device or a system, or receiver 110 and/or transmitter 120 can be separate from the application source 104 (e.g., a router or Wi-Fi device coupled with a user device that is an application source 104). Application source 104 can utilize applications 106 that can be configured to use, access or communicate with (e.g., exchange packets 180) remote applications 156 of the application destination 154.

Application 106 can be any user-side application transmitting packets 180 upstream towards the application destination 154 and its application 156. For example, application 106 can include, for example, a local video game application accessing a remote video game application 156 on a cloud-based application destination 154. For example, application 106 can include, for example, a video conferencing local application on an application source 104 (e.g., a user's laptop) exchanging video and audio streams (e.g., packets 180) with, or via, an application destination 154 and its locally or remotely executed applications 156. Application 106 can use a transmitter 120 to transmit packets 180 upstream, via network 101, to the application destination 154, via receiver 160.

Applications 156 can include any server-side applications that can be used by user-side applications 106. Application 156 can include, for example, a gaming platform on a cloud-based service or a remote server provided to a user (e.g., application source 104) via a user-side application 106 for accessing the gaming platform application 156. Application 156 can include a remote access service, a document database, a video streaming application, an AR or VR application or any other type and form of application users can access via applications 106. Application 156 can use a transmitter 170 to transmit packets 180 downstream, via network 101, to the application destination 154, via receiver 110.

Source Side 102 (e.g., user side) can include any combination of hardware and software for application category detection and marking of packets for upstream and downstream QoS service and delivery of network packets 180. Source side 102 can include any combination of user device, such as computers, laptops, tablets or smartphones that can be communicatively coupled with devices providing network connections, such as Wi-Fis, access points of cellular networks or other devices.

Destination side 152 (e.g., server side) can include any combination of hardware and software for providing application which the application source is accessing and for processing the network packets according to the QoS set up by the source side transmitter 120. For example, destination side 152 can include a cloud service, virtual machine or one or more servers providing applications 156 that are accessed by applications 106 of the application sources 104 (e.g., source devices).

Receiver 110 can include any combination of hardware and software for receiving and processing packets 180 to facilitate application category detection and marking of packets for QoS service and delivery. Receiver 110 can be deployed on the source side 102 to receive downstream packets 180 from the destination side 152 or on the destination side 152 to receive upstream packets 180 from the source side 102. Receiver 110 can manage incoming data using functions, such as a downstream session correlator 112, a receive scheduler 114 and/or QoS queue receiver 116. Receiver 110 can associate incoming packets with their respective sessions, organize the order and timing of packet delivery, and optimize network traffic flow. Receiver 110 can prioritize and allocate network resources based on QoS parameters, to facilitate processing of packets 180 in accordance with specific QoS specifications.

Transmitter 120 can include any combination of hardware and software for transmitting packets 180 to facilitate application category detection and marking of packets for QoS service and delivery. Transmitter 120 can be deployed on the source side 102 to transmit upstream packets 180 to the destination side 152 or on the destination side 152 to transmit downstream packets 180 to the source side 102. Transmitter 120 can include a category detection functionality or a program to detect application categories based on contents (e.g., header or payload) of data packets 180 of the respective applications 106. Transmitter 120 can identify upstream sessions, ensure data coherency and proper management, and categorize applications 106 for their QoS specifications. Transmitter 120 can label data packets with QoS-related indicators (e.g., packet markers 126), and assign QoS parameters based on these indicators. Transmitter 120 can prioritize and allocate resources according to the defined QoS settings, manages the order and timing of packet delivery, and facilitating responsive and data communication between network devices.

Session detector 122 can include any combination of hardware and software for identifying, detecting or determining a session of an application 106 and/or application 156. Session detector 122 can include any functionality to detect the session of the application 106. Session detector 122 can match or detect which application 106 corresponds to which session established between the source side 102 and any external devices (e.g., devices on the destination side 152). Session detector 122 can include the functionality to detect upstream sessions (e.g., destined to the destination side 152) by parsing, inspecting and/or analyzing at least a portion of the network packets (e.g., via shallow packet inspection) and extract appropriate header or application layer information from the upstream packets 180.

Session detector 122 can detect attributes of the sessions of the applications 106. Attribute of the session can include any data or information on the session of an application 106. Attributes of a session can include any metrics, statistics of characteristics of the network traffic, packets of the network devices and/or devices participating in the session such as the start/end of the session, devices involved in the session, bandwidth variations of the session, inter-packet interval statistics in the session, jitter or delay of the session, bandwidth used or desired, throughput or any other data pertaining to a session.

Category detector 124 can include any combination of hardware and software for detecting categories of the applications 106 and/or 156. Category detector 124 can include functionality to match information or data extracted from packets 180 with categories of applications. For example, category detector 124 can match information from a data packet 180 with a category of application 106 for augmented reality (AR) or virtual reality (VR) which can have a particular QoS settings or parameters. Category detector 124 can automatically detect the categories of the applications 106 and/or 156 for the upstream sessions (e.g., between application source 104 and application destination 154.

Category detector 124 can include the functionality to provide detection based on or using one or more stage or functionalities processing data packets 180. Category detector 124 can include a multi-stage processing of a select set of packets 180 associated with the application sessions. For example, category detector 124 can select a first one or more packets during establishment of a connection or session between the applications 106 and applications 156 or between any source side 102 device and any destination side 152 device. Category detector 124 can use the selected one or more packets 180 to detect the category of the application 106 and/or 156. Category detector 124 can include or use a lookup table (e.g., a database stored in a storage 225) in which various applications can be matched, tied or linked with categories of QoS for such applications. For example, a lookup table can identify an application and one or more QoS settings or specifications for the category of the application.

Packet processing by the category detector 124 can be based on a dynamic packet inspection, which can help save computational resources. Such analysis can include inspection of the header information of network packets, or analysis of the packet's content or payload. For instance, the analysis can include inspecting one or more packet header details, such as source and destination addresses, port numbers, and protocol information and it can be used for packet classification and routing purposes, allowing for the identification and differentiation of packets 180 based on packet header details.

Category (e.g., of an application 106 and/or 156) can include any classification used to group various applications 106 and/or 156 and services based on specific QoS service quality specifications, such as low latency, high throughput, low packet loss, reliability, jitter or delay control, packet ordering, scalability, security, congestion management, redundancy or backup paths, and others. Categories can allow the system 100 to apply differentiated treatment to different types of network traffic. For example, one category of an application 106 for video conferencing, can specify a range of low latency, and a range of high bandwidth (e.g., to accommodate real-time voice or video communication). A different category can be for another application 106, for high throughput, such as a file transfer application 106 that can utilize a different QoS specification. By assigning QoS parameters to different categories, system 100 can facilitate prioritizing and allocating resources to satisfy all the applications 106 and/or 156 in accordance with their specified type of QoS for that given category of applications 106 and/or 156. Application categories can be classified for different QoS specifications, that can include any combination of range for latency, throughput, bandwidth, packet loss, reliability, delay, jitter, congestion, scalability, redundancy, backup, security or any other QoS setting.

Packet marker 126 can include any value, parameter or a mark for marking select packets 180. Packet marker 126 can be handled by transmitter 120 and/or category detector 124 to mark packets 180 with the packet marker 126. Packet marker 126 can be inserted or entered into a field or header of one or more packets 180 to indicate the category of the respective application 106 and/or 156. Packet marker 126 can be a parameter, value or character of a differentiated service code point (DSCP), a field in the IP header that can be used to classify or manage network traffic by specifying the priority level or QoS for a packet in an IP network. For example, based on the results of the application category detection by the category detector 124, system 100 can dynamically mark (e.g., with DSCP) the packets 180 in the upstream direction, based on the detected application session attributes. Packet marker 126 can use, correspond to or include session attributes determined by the session detector 122 to dynamically map the packets 180 by inserting markers 126 indicative of the corresponding QoS specifications to be applied. The marker can include a value in a field, such as a header, including for example a value in DSCP of IP header.

QOS mapper 128 can include any combination of hardware and software for marking the packets 180. QoS mapper 128 can include the functionality for mapping or including the packet markers 126 in upstream packets (e.g., or downstream packets) in accordance with appropriate QoS queues for upstream (e.g., or downstream) transmission. QoS mapper 128 can insert or enter the values or parameters of the packet marker 126 into the packets 180 (e.g., headers).

Transmit QOS Queues 130 can include any combination of hardware and software for controlling or managing queue for transmission of network packets 180. Transmit QoS queues 130 can include network-specific queuing mechanisms for QoS implementation. For instance, transmit QoS queues 130 can include Wi-Fi transmit QoS queues are various Access Category (AC) queues, and DOCSIS transmit QoS queues are those for queue-building traffic and non-queue-building traffic.

Transmit scheduler 132 can include any combination of hardware and software for scheduling and transmitting packets 180. Transmit scheduler 132 can schedule the upstream packet 180 transmissions on the network 101 (e.g., an IP network), based on the transmit QoS queue definitions and the packet queuing status.

Downstream correlator 112 can include any combination of hardware and software for correlating downstream transmissions with upstream transmissions. Downstream correlator 112 can correlate downstream transmissions of a session of an application 106 and/or 156 with upstream transmissions of the same session, whether on a source side 102 or server side 152. Downstream correlator 112 can receive packet markers 126 for a particular session of a particular application 106 and use the markers for the following upstream transmissions by the same device or side 102 or 152. In doing so, downstream correlator 112 can maintain reusing packet markers 126 that were already determined for the QoS of a particular application session, without having to repeat the process of detecting the application category or identifying the session attributes of the application to determine the appropriate QoS. Downstream correlator 112 can identify the downstream application sessions and correlate and associate the sessions of the downstream packets 180 with the corresponding upstream sessions and such upstream sessions' packets 180. Downstream correlator 112 can use the markers 126 in the corresponding upstream or downstream packets 180 to control/configure the QoS queue receivers 116. A session can include any period of interaction or communication between two computing devices or systems, such as involving a series of related actions or transactions (e.g., exchange of data packets 180) within a defined time frame.

QoS queue receivers 116, also referred to as receive QoS queues, can include any combination of hardware and software for queuing received packets 180. QoS queue receiver 116 can be included in a source side 102 or destination side 152 and can manage queue for upstream or downstream transmissions. QoS queue receiver 116 can include the QoS queuing mechanisms for the source side 102 or destination side 152 for the received packets 180 from the network 101.

Receive scheduler 114 can include any combination of hardware and software for managing and controlling the processing and forwarding of downstream packets being received by the source side 102. For instance, receive scheduler 114 can schedule and control the timing for the processing and forwarding of the downstream or upstream packets 180 in the receive QoS queues 116.

Upstream detector 162, also referred to as upstream session detector, can include any combination of hardware and software that detects upstream sessions (e.g., via shallow packet inspection) extracts markers 126 from upstream packets for configuring the QoS Queue receivers 116. Upstream detector 162 can include the functionality to implement dynamic packet inspection on packets 180 and determine (e.g., from internet layer header, such as IP header) to which session does an incoming packet 180 belongs or corresponds. Upstream detector 162 can extract or copy packet markers 126 (e.g., QoS markers) to provide them to QoS queue receivers 116.

Session correlator 172 can include any combination of hardware and software for correlating downstream transmissions of a session of an application 106 and/or 156 with upstream transmissions of the same session. Session correlator 172 can be used in downstream or upstream configurations (e.g., by receivers 110 or 160) to reuse or reinsert packet markers 126 to next series of packets 180 to be transmitted based on, or using, packet markers 126 of the packets 180 received.

Figure 2:
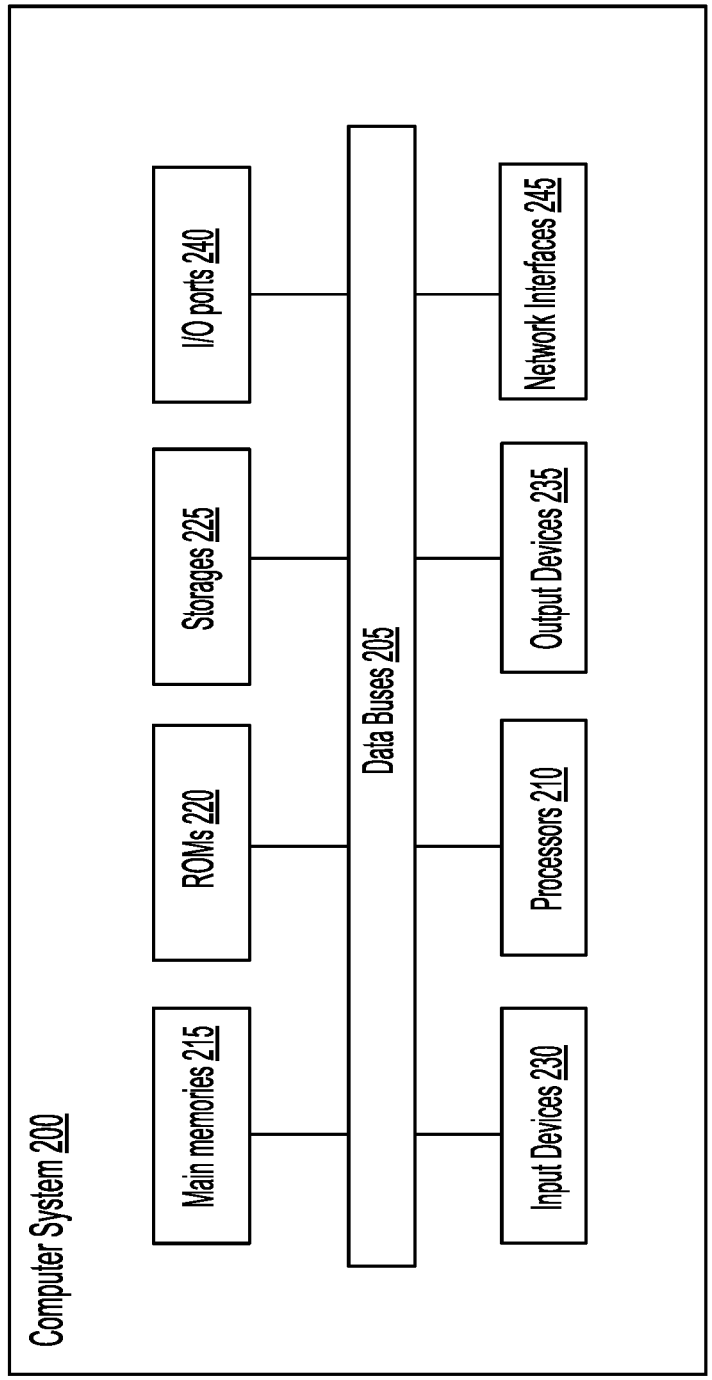
FIG. 2 is a block diagram illustrating an architecture for a computer system that can be employed to implement elements of the systems and methods described and illustrated herein.

FIG. 2 illustrates a block diagram of an example computer system 200, which can also be referred to as a computing system 200. Computer system 200 can include or be used to implement any computation or processing (e.g., command, protocol or data processing) described herein. Computer system 200 can be included in and run any device (e.g., server) or service of a source side 102 or destination side 152. Computer system 200 can be used for operating or running a device such as an application source 104, transmitter 120 or 170, receiver 110 or 160, device 302, or any other feature or functionality described herein.

Computing system 200 can include at least one bus data bus 205 or other communication component for communicating information and at least one processor 210 or processing circuit coupled to the data bus 205 for processing information. Computing system 200 can include one or more processors 210 or processing circuits coupled to the data bus 205 for exchanging or processing data or information. Computing system 200 can include one or more main memories 215, such as a random access memory (RAM), dynamic RAM (DRAM) or other dynamic storage device, which can be coupled to the data bus 205 for storing information and instructions to be executed by the processor(s) 210. Main memory 215 can be used for storing information (e.g., data, computer code, commands or instructions) during execution of instructions by the processor(s) 210.

Computing system 200 can include one or more read only memories (ROMs) 220 or other static storage device coupled to the bus 205 for storing static information and instructions for the processor(s) 210. Storage 225 can include any storage device, such as a solid state device, magnetic disk or optical disk, which can be coupled to the data bus 205 to persistently store information and instructions.

Computing system 200 may be coupled via the data bus 205 to one or more output devices 235, such as speakers or displays (e.g., liquid crystal display or active matrix display) for displaying or providing information to a user. Input devices 230, such as keyboards, touch screens or voice interfaces, can be coupled to the data bus 205 for communicating information and commands to the processor(s) 210.

Input device 230 can include, for example, a touch screen display (e.g., output device 235). Input device 230 can include a cursor control, such as a mouse, a trackball, or cursor direction keys, for communicating direction information and command selections to the processor(s) 210 for controlling cursor movement on a display.

Computer system 200 can include input/output ports 240, also referred to as I/O ports 240, can include physical interfaces that facilitate or provide communication between external or peripheral devices and processor(s) 210 and/or memory 215. I/O ports 240 can be connected to data bus 205, allowing the transfer of data between the processor(s) 210, memories 215, and any external devices (e.g., keyboards, mice, printers, and external storage devices). Computer system 200 can also include one or more network interfaces 245 coupled via data buses 205. Network interfaces 245 can include any physical or virtual components enabling communication between the computer system 200 and any external networks (e.g., the Internet). Network interface 245 can provide transfer of data between the processor(s) 210, memories 215 and any external networks.

The processes, systems and methods described herein can be implemented by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors 210 in a multi-processing arrangement may also be employed to execute the instructions contained in main memory 215. Hard-wired circuitry can be used in place of or in combination with software instructions together with the systems and methods described herein. Systems and methods described herein are not limited to any specific combination of hardware circuitry and software.

Although an example computing system has been described in FIG. 2, the subject matter including the operations described in this specification can be implemented in other types of digital electronic circuitry, or in computer software, firmware, or hardware, including the structures disclosed in this specification and their structural equivalents, or in combinations of one or more of them.

Figure 3:
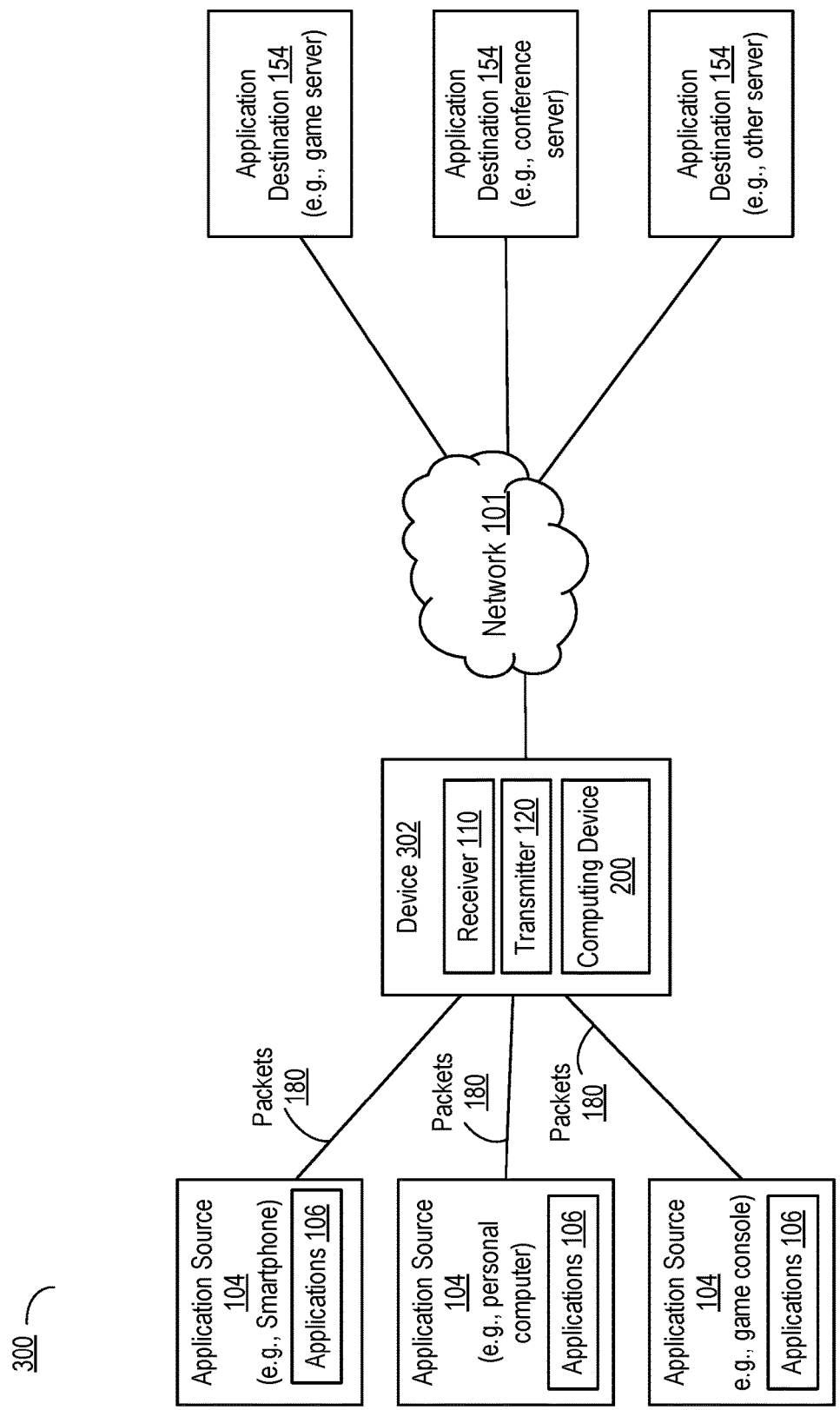
FIG. 3 is a block diagram of a system for application category detection and marking of packets for QoS.

FIG. 3 illustrates a block diagram of an example system 300 for application category detection and marking of packets for QoS. System 300 can be a device 302 disposed between one or more applications sources 104 (e.g., smartphone, personal computer and game console), each one of which can run any number of applications 106. System 300 can have application source 104 devices configured to communicate via a network 101 (e.g., wireless network, internet), with one or more application destinations 154 (e.g., remote servers), using any number of communication protocols (e.g., TCP/IP, UDP etc. . . . ). System 300 can include devices including processors (e.g., 210) that can be coupled with memory (e.g., 215) that can store instructions, commands, computer code and/or data to enable the devices implementation of the present solution.

Device 302 can include any combination of hardware and software for receiving and transmitting packets 180 and implementing application category detection and marking of packets for QoS. Device 302 can include, for example, a Wi-Fi router, an STB, an access point, or a function within an application source 104 device, such as a user device, including a smartphone, computer, tablet or a laptop. Device 302 can include one or more receivers 110 and one or more transmitters 120. Device 302 can include one or more computing devices 200.

Network packets 180 can be input into a category detection program or functionality (e.g., in a transmitter 120), which can correspond to or involve, applications 106, such as cloud-based online games, conferences or other applications. Some applications 106, such as cloud games and video conferences, can be assigned or correspond to a high priority queue. Other applications 106 can be assigned or correspond to normal or low priority queue. The system can assign the packet priority based on the markings in the data packets 180.

System 300 can detect the application of data flow from the customer premises equipment (CPE), such as devices on source side 102. Category of the application 106 or 156 can detected from the information or data in the data packet 180. Category of the application 106 can be used to determine, match, select or identify the QoS to assign to the packets 180 of the session corresponding to the application 106 for which the category was detected. In some examples, the support category can include a category of applications with low latency and high bandwidth, such as video conference and gaming applications.

Figure 4:
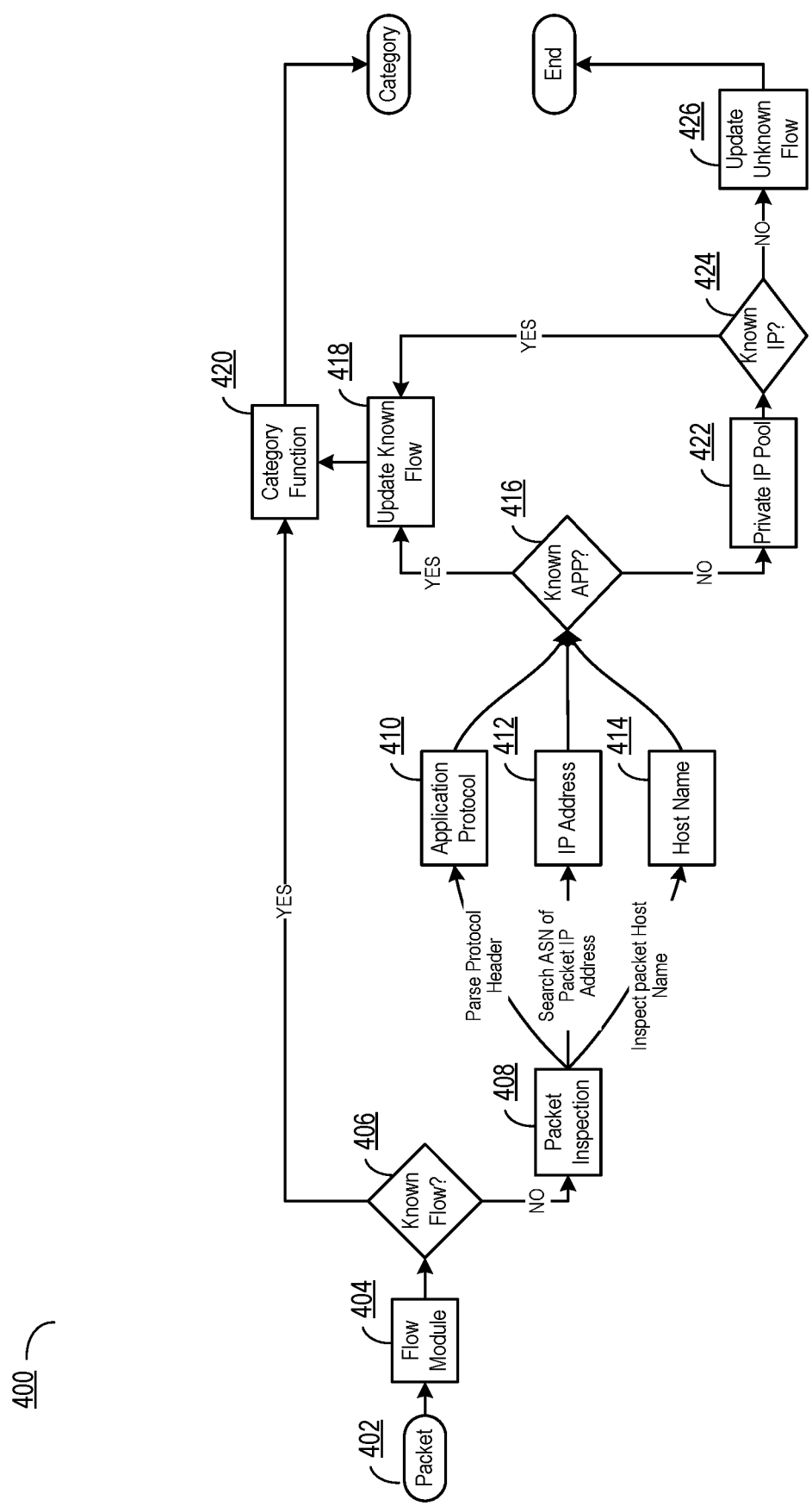
FIG. 4 illustrates an example flow diagram of a method for packet inspection and application category detection.

FIG. 4 illustrates an example flow diagram of a method 400 for packet inspection and application category detection. Example method 400 can be used for known or unknown flows of packets 180, such as known packet flows for applications whose categories are already determined or unknown packet flows for applications whose categories are not yet determined.

Example method 400 can include an act 402 at which a device (e.g., device 302) can receive or detect network packets 180, using for example, a receiver 110 or receiver 160. At 404, network packets 180 can be sent or forwarded to a flow controlling function, such as receiver scheduler 114. At 406, receivers 110 can make a determination (e.g., via downstream correlator 112) if the received packets 180 correspond or belong to a known flow, such as a flow of packets 180 of a known session of application 106 or 156. At 420, if the received packets 180 belong or correspond to a known flow of packets (e.g., a registered or known past or ongoing session of an application), then QoS can go to a category detector 124 that can identify and send the category indication to apply the correct QoS for that category. At 408, if the flow is unknown, the solution can perform a packet inspection (e.g., by category detector 124 to detect the category of the application 106 along with a session detector 122 to detect the session of the application).

At 408, category detector 124 can perform multi-stage processing of the packet 180. For example, at 410 category detector 124 can parse a header of the packet (e.g., a protocol header, such as a header of an encryption protocol) to identify the application 106 and/or its session and category. For example, at 412 category detector 124 can search the autonomous system number (ASN) corresponding to a collection of IP networks and routers under the control of a single organization or enterprise presenting a common routing policy to the internet, with respect to the packet 180's IP address. For example, at 414 category detector can inspect packet host name in the payload or headers of the packet 180.

At 416, upon detecting or identifying application 106 from the packet 180, session detector 120 can determine if the packet 180 belongs or corresponds to a known session or application 106. If, it is a known application 106, then known flow can be updated. For example, a known flow (e.g., a prior determined and used QoS settings or specifications) can be used for the packet 180 and all the packets of that session. For example, a request for determining or detecting a category for a known (e.g., installed and/or previously used application) can be made to the category detector 124. At 420, category detector 124 can detect the category of the application based on the parsed data or information of the packet 180.

At 422, if the application 106 is not known, a private IP Pool can be used to search any internal extensions of the application or its identifiers (e.g., IP address) on the local network, known identifiers (e.g., IP addresses) used on the local network and which are not in public ASN or for operator private applications with known IP address. For example, an IP address or other identifier of an application 106 on a local area network can be determined based on the parsed data (e.g., header or payload information) of the packet 180 identifying the name of the application 106 to which the packet belongs. At 424, if IP of the packet is known, the update of known flow can be implemented as in 418. If the IP is unknown, an update of the unknown flow can be implemented at 426 to maintain information on the unknown flow, which could then be used to perform an in-depth inspection of the packet.

Figure 5:
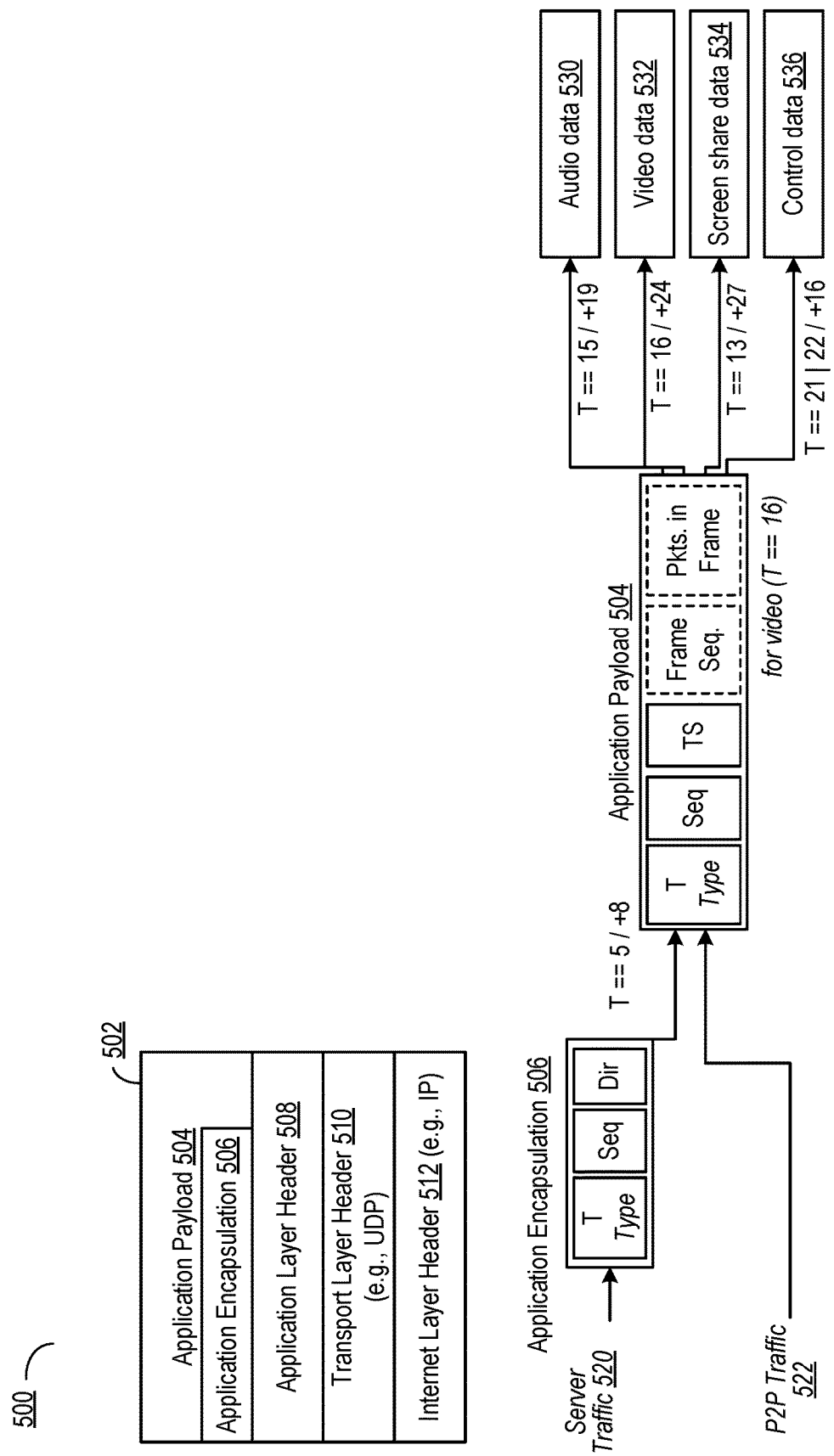
FIG. 5 illustrates an example of a block diagram for application category detection based on application payload in the context of the Open Systems Interconnection (OSI) model.

FIG. 5 illustrates an example of a block diagram 500 for application category detection based on application payload in the context of an OSI model. Example 500 shows an OSI stack 502 of a packet 180, including headers and payload in various OSI layers, including internet layer, transport layer and application layer. A packet 180 can include portions (e.g., data or information) corresponding, defining or identifying various aspects of the packet 180 in the context of any of the OSI layers.

For instance, packet 180 can include contents of any layer of OSI stack 502 of a packet 180, including (e.g., data, headers or payload) of internet layer of OSI stack 502, such data (e.g., headers and/or payloads) of internet control (IP), internet control message protocol (ICMP), internet group management protocol (IGMP), address resolution protocol (ARP), reverse address resolution protocol (RARP). Packet 180 can include contents of transport layer, such as transport control protocol (TCP) or user datagram protocol (UDP). Packet 180 can include contents of application layer, such as hypertext transport layer protocol/secure (HTTP/S), domain name system (DNS), simple object access protocol (SOAP), quick UDP internet connections (QUIC), simple mail transfer protocol (SMTP), simple network management protocol (SNMP), transport layer security (TLS), real-time transport protocol (RTP), real-time streaming protocol (RTSP), simple service discovery protocol (SSDP, network file system (NFS), file transfer protocol (FTP), TELNET, trivial file transfer protocol (TFTP) or NETBIOS.

Packet 180 can be, for example, a packet with an RTP payload of a videoconference SFU encapsulation of a video conferencing application 106. Packet 180 can have contents arranged according to OSI layers 502, including an application payload 504 (e.g., RTP payload) with an application encapsulation 506 (e.g., selective forwarding unit or SFU of a video conferencing application). OSI stack 502 of the packet 180 can include an application layer header 502 (e.g., RTP header), a transport layer header 510 (e.g., UDP), and an internet layer header 512 (e.g., IP).

Application encapsulation 506 can include server traffic 520, which can include data or information corresponding to application 106 that can be generated by a server of an application destination 154. Application encapsulation 506 can include information or data identifying a particular application 106 (e.g., video conferencing or a video gaming application) executed on the application source 104.

Application payload 504 can include the payload of the application 106, as well as the application encapsulation 506 (e.g., server traffic 520) along with any peer-to-peer (P2P) traffic 522, such as various video streams exchanged during a video conference. Application payload 504 can include audio data 530, which can include any audio, voice or sound related data or information exchanged between users of the video conferencing application 106. Application payload 504 can include video data 532, including any video streams of the video conferencing application 106. Application payload 504 can include screen share data 534, including any data for sharing screenshots or views of user's displays. Application payload 504 can include control data 536 corresponding to control of any of the streams or transmissions.

Figure 6:
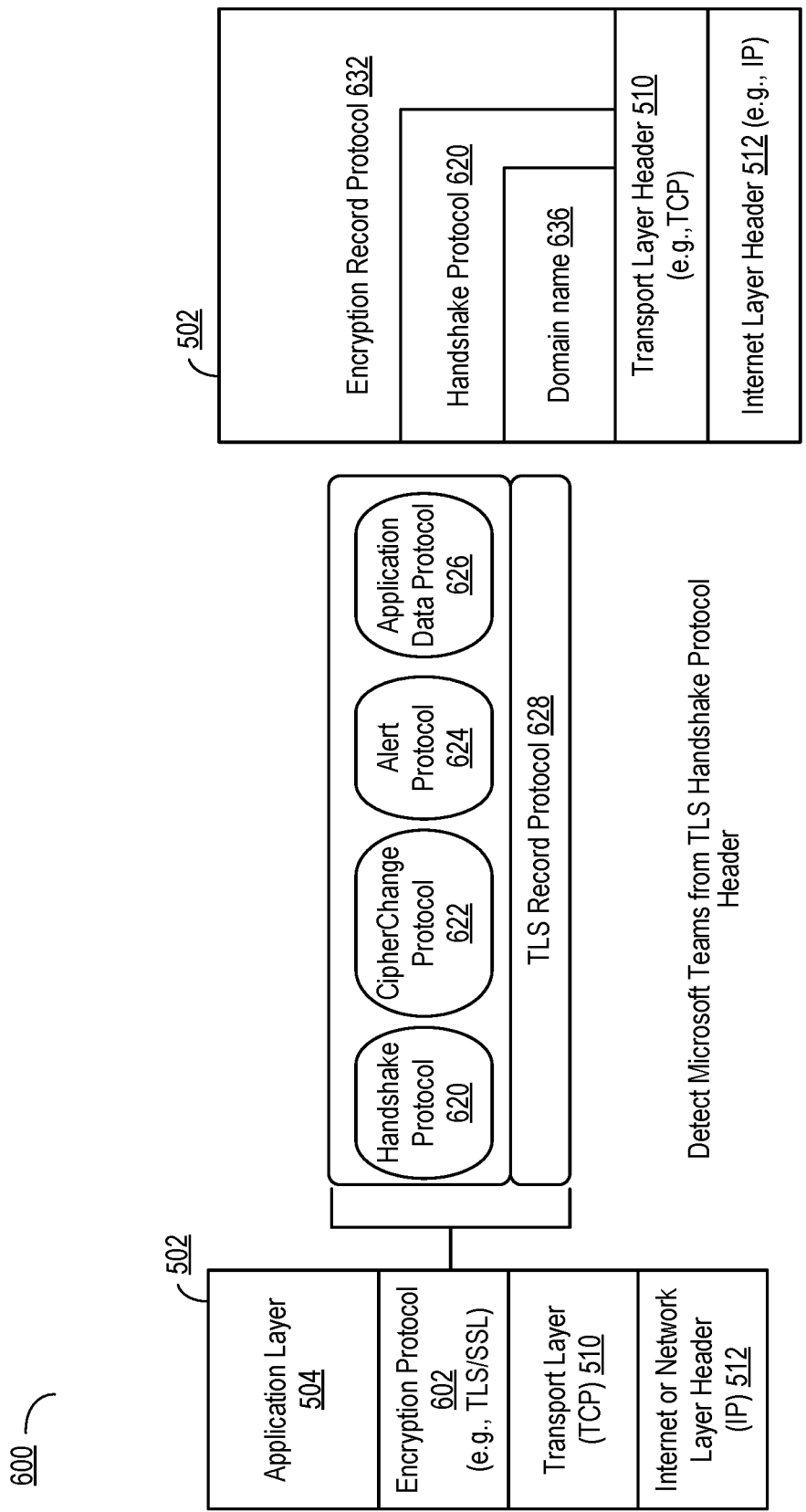
FIG. 6 illustrates an example of a block diagram for application category detection based on a handshake protocol in the context of the OSI model.

FIG. 6 illustrates an example of a block diagram 600 for application category detection based on a handshake exchange or a handshake protocol in a connection and in the context of OSI model. The handshake exchange or handshake protocol can correspond to exchange of packets 180 having information (e.g., headers or payloads) for establishing a secured connection or an encrypted communication session between the source side 102 and destination side 152. Example block diagram 600 can include a packet 180 with OSI layers 502 that can include an application layer 504 (e.g., TLS, SMTP or QUIC), an encryption protocol 602 (e.g., TLS or SSL), a transport layer (e.g., TCP) 510 and an internet or network layer header 512. Packet 180 can include an OSI stack arrangement having an encryption record protocol 632 (as an application layer 504), in which a handshake protocol 620 is implemented referencing, including or indicating a domain name 636. Packet 180 can include a transport layer header 510 and internet layer header 512.

Packet 180 can include a header including or referencing data for establishing a secured connection (e.g., encrypted connection or session) between the source and destination devices. For instance, packet 180 can include data or content of an encryption protocol 602, such as a TLS or SSL protocol for establishing a secured or encrypted connection between devices. Encryption protocol 602 can include or correspond to a handshake protocol 620, a cipherchange protocol 622, alert protocol 624 and application data protocol 626 of a TLS record protocol 628. Handshake protocol 620 in an encryption protocol like TLS/SSL (e.g., TLS record protocol 628) can include a negotiation phase in which two devices establish a secure communication session by agreeing on encryption methods, verifying identities, and exchanging encryption keys. Cipherchange protocol 622 can include a phase in which devices switch from their initially negotiated encryption parameters to the agreed-upon encryption algorithms and keys for secure data transmission, finalizing establishment of a secure communication channel. Alert protocol 624 can include a functionality for sending warning or error messages to the communication parties to notify them of potential issues, security breaches, or the termination of a secure connection. Application data protocol 626 can include a stage where encrypted application-specific data is transmitted securely between devices.

Encryption record protocol 632 can include any encryption protocol for encryption between devices. Encryption record protocol 632 can include a TLS record protocol for fragmentation, compression and/or encryption or decryption of data to create secure TLS records that are transmitted between devices. Encryption record protocol 632 can include and utilize any feature of encryption protocol 602, including handshake protocol 620. Encryption record protocol can (e.g., within a handshake communication or phase) identify, indicate or refer to a domain name 636.

Domain name 636 can include a string of characters indicating a web address of a location on the internet. Domain name 636 can include any combination of a host name and a top-level domain (TLD) extension (e.g., example.com). Domain name 636 can include a fully qualified domain name (FQDN) including a name of a server or a web address.

Figure 7:
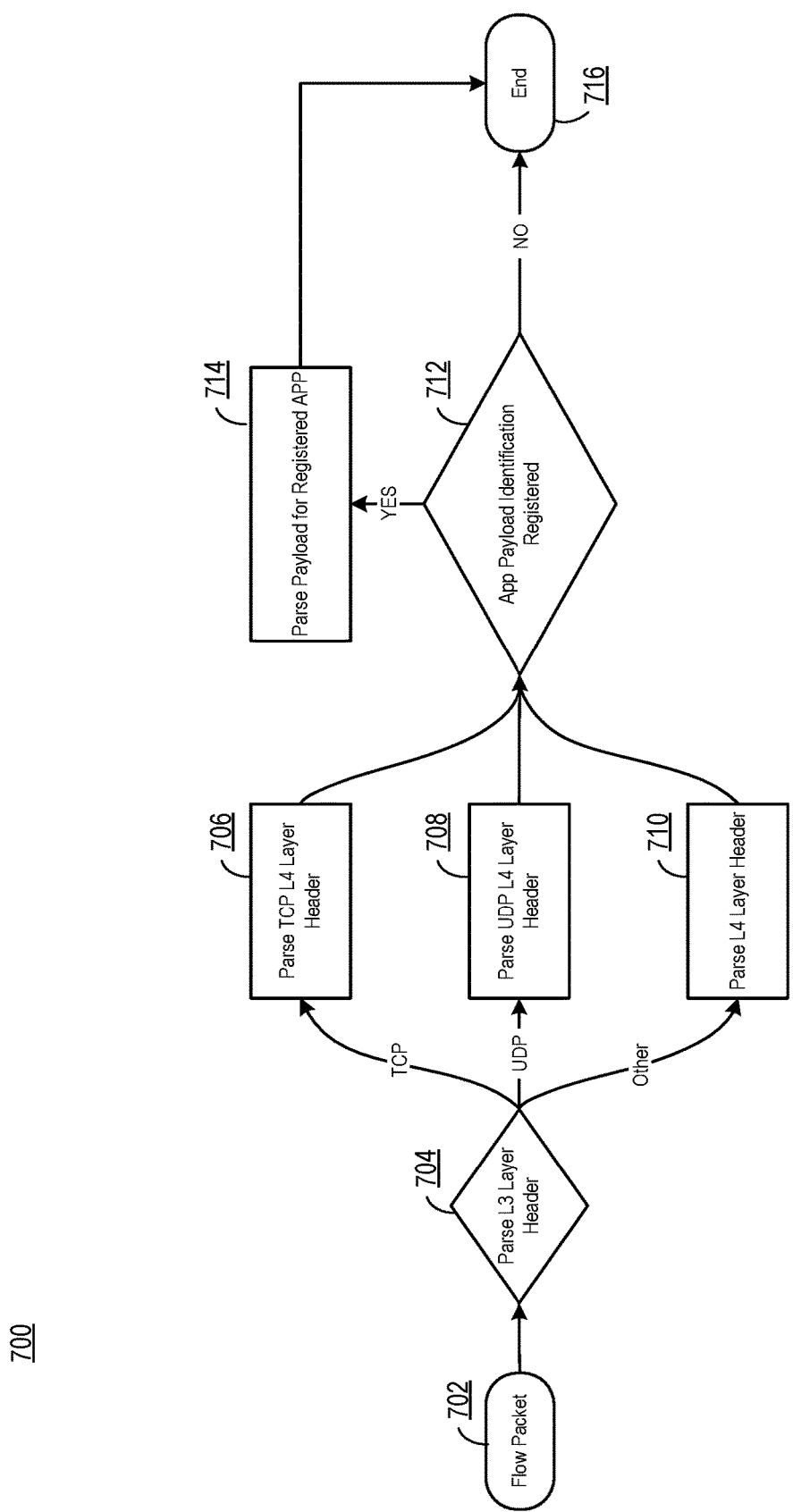
FIG. 7 illustrates an example flow diagram of a method for packet inspection and application category detection.

FIG. 7 illustrates an example flow diagram of a method 700 for packet inspection and application category detection. Method 700 can include acts 702-716, which can be performed by transmitter 120 components, such as category detector 124. At 702, flow packet 180 can be detected. At 704, layer header can be parsed using any one of a plurality of stages or functions. For example, at 706 a TCP header can be parsed. For example, at 708 a UDP header can be parsed. For example, at 710 any layer 4 header can be parsed.

At 712, a determination can be made as to whether the application payload identification is registered. For example, an application payload identification can include a domain name indicating or corresponding to a particular application being used (e.g., a video conferencing, gaming, streaming or other application). Category detector 124 can utilize the application payload identification to check whether a category for that application has already been determined.

At 714, if the application payload identification is registered, the category detector 124 can utilize a parser to parse payload for the registered application. For example, transmitter 120 can parse the contents of the application layer payload to identify any indications of the application. Once identified, the application can then be associated with its respective category corresponding to QoS settings or parameters to be assigned (e.g., marked) with respect to the packets 180. If the application payload identified is not registered, the method can end this phase of its processing.

Figure 8:
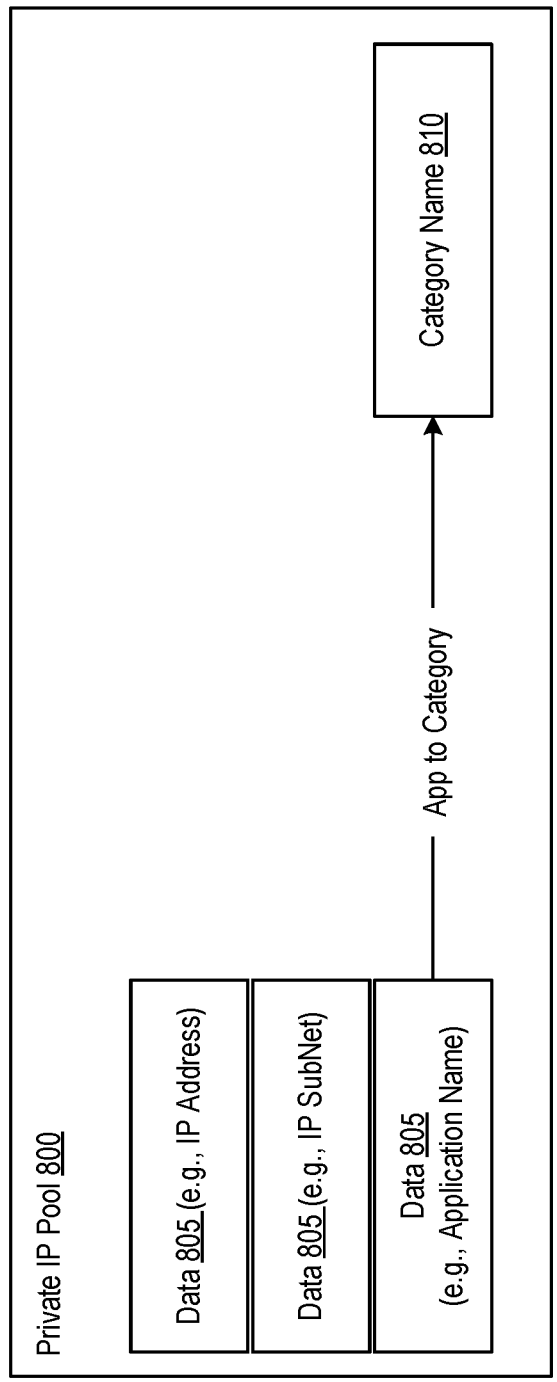
FIG. 8 illustrates an example of an IP pool database.

FIG. 8 illustrates an example of an IP pool database. Private IP pool 800 can include any data 805 for identifying applications or devices on which they operate. Data 805 can include IP addresses, IP sub masks or application names. Private IP pool 800 can include any database or collection of identifiers for applications or devices, such as application MAC addresses, local identifiers (e.g., IP addresses within a private network), port numbers or any other information corresponding to applications 106 and/or 156. Private IP pool 800 can include or involve data or information indicative of an internal extension of IP addresses of applications, such as known application IP addresses which are not in public ASN. Private IP pool 800 can include or involve data or information for operator private applications, such as known identifiers or IP addresses.

The technical solutions can include and utilize any information or data for ASN IP detection to determine Autonomous System Number (ASN) linked to an IP address. ASN IP information or data can allow insights into network ownership and routing policies. Data can include country information and website information, hosted domains and number of IP addresses. Data for ASN can include IP address ranges that can be used to identify an IP of the application (e.g., 106 or 156). The system can detect IP addresses from ASN for applications 106 or 156.

The technical solutions can include information on protocols and hostname details, identifying various protocols and hostname information to be used for identifying applications and detecting categories.

For example, technical solutions can include data, such as provided in Table 1 below:

TABLE 1 showing protocol and hostname data.

| Protocol | Hostname |
|---|---|
| dhcp | host name option (option 12) |
| tls | TLS extension id 0(host name) |
| quic | SNI (Server Name Indication) field in crypto |
| mail_smtp | server response 220 |
| netbios | name in payload |
| mgcp | endpoint hostname start with '@' in content |
| xiaomi | client meta data option 0x3a |
| whoisdas | dst_port is 43/4343 payload |
| collectd | block type is host block(0x00) in payload |
| stun | realm in attribute |
| sd_rtn | SNI (0X0453e49) in payload |
| munin | host in payload |
| fastcgi | "HTTP_HOST" field in payload |
| http | "HOST:" header |
| ssdp | |
| thunder | |
| zattoo | |
| crossfire | |
| fasttrack | |
| directdownloadlink | |
| soap | |
| icecast | |
| rtsp | |
| bittorrent | |
| openft | |
| gnutella | |
| world_of_warcraft | |
| mpegdash | |
| irc | |
| maplestory | |

The technical solutions can include instructions or code for identifying applications 106 or 156 from payload (e.g., encryption or application layer). Code or instructions can include or identify protocol hostnames or application names. For instance, the technical solutions can include instructions, computer code or data for establishing encryption in which protocol hostnames or application names can be identified or indicated, revealing names of applications 106 or 156 based on which QoS categories can be selected or determined.

For example, the code or instructions can implement encryption handshake processing that can include data or parameters identifying the application 106 or 156, such as:

> Transmission Control Protocol, Src Port: 527 44, Dst Port: 443, Seq: 1, Ack: 1, Len: 178
\/Transport Layer Security
 \/ TLSv1.2 Record Layer. Handshake Protocol: Client Hello
  Content Type: Handshake (22)
  Version: TLS 1.2 (0x0303)
  Length: 173
  \/ Handshake Protocol: Client Hello
   Handshake Type: Client Hello (1)
   Length: 169
   Version: TLS 1.2 (0x0303)
   > Random: 63b4ee31990e8ff14aa64986f1ec98f3895338ae6c3671317a003397543de848

Session ID Length: 0
Cipher Suites Length: 36
> Cipher Suites (18 suites)
Compression Methods Length: 1
> Compression Methods (1 method)
Extensions Length: 92
∨ Extension: server_name (len=18)
   Type: server_name (0)
   Length: 18
   ∨ Server Name Indication extension
   Server Name list length: 16
   Server Name Type: host_name (0)
   Server Name length: 13
   Server Name: www.webex.com
> Extension: status_request (len=5)
> Extension: supported_groups (len=8)
> Extension: ec_point_formats (len=2)
> Extension: signature_algorithms (len=26)
> Extension: session_ticket (len=0)
> Extension: extended_master_secret (len=0)

| | | | | |
|---|---|---|---|---|
| 0000 | 0c29 ef e7 f8 00 d4 81 | d7 6b 17 9d 08 00 45 00 | •)•••••• | •k•••e• |
| 0010 | 00da7e e7 40 00 80 06 | 00 00 0a 96 43 f0 17 4a | ••~•@••• | ••••c••J |
| 0020 | d191 ce 08 01 bb 67 d9 | d5 b7 79 de 4c c9 50 18 | ••••••g• | ••y•L•P• |
| 0030 | 040038 2e 00 00 16 03 | 03 00 ad 01 00 00 a9 03 | ••g.•••• | •••••••• |

In another example, the code or instruction can implement encryption handshake processing that can include data or parameters identifying another application 106 or 156, such as:

∨ Transmission Control Protocol, Src Port: 57363, Dst Port: 443, Seq: 1, Ack: 1, Len: 517
> Transport Layer Security
  ∨ TLSv1.3 Record Layer: Handshake Protocol: Client Hello Content Type: Handshake (22)

Version: TLS 1.0 (0x0301)
    Length: 512
  ∨ Handshake Protocol: Client Hello
    Handshake Type: Client Hello (1)
    Length: 508
    Version: TLS 1.2 (0x0303)
    Random: 3939432170865178c7a780473316e362e007affffa56fcfc135787b026d58fc7
    Session ID Length: 32
    Session ID: 15bdb93s7513cc36d6168a2fca45348b25ef8ee73c378105ba80424315e5e32c
    Cipher Suites Length: 18
  > Cipher Suites (9 suites)
    Compression Methods Length: 1
  > Compression Methods (1 method)
    Extension Length: 417
  ∨ Extension: server_name (len=21)
     Type: server_name (0)
     Length: 21
    ∨ Server Name Indication extension
     Server Name list length: 19
     Server Name Type: host_name (0)
     Server Name length: 16

Server Name: us05ww3.zoom.us

> Extension: ec_point_formats (len = 4)
> Extension: supported_groups (len = 12)

| | | | | |
|---|---|---|---|---|
| 00a0 | 00 00 10 | 75 73 30 35 77 77 77 33 2e 7a 6f 6f 6d | ... | us05w ww3.zoom |
| 00b0 | 2e 75 73 | 00 0b 00 04 03 00 01 02 00 0a 00 0c 00 | .us | .... ........ |
| 00c0 | 0a 00 1d 00 17 00 1e 00 19 00 18 00 05 00 05 01 | | ........ | ........ |
| 00d0 | 00 00 00 00 00 10 00 0b 00 09 08 68 74 74 70 2f | | ........ | ...http/ |
| 00e0 | 31 2e 31 00 16 00 00 00 17 00 00 00 31 00 00 00 | | 1.1 ..... | ....1... |

Technical solutions can include the computer code or instructions based on which particular applications can be detected within the packets 180, such as:

Check APP Protocol (141)-Found APP [Webex]
Flow: app [Webex] (3) cat [Conference] (1) seq: 116 [52.207.142.243]: 443< >[172.18.0.14]: 46466 proto: TCP packets: (1)< >(3) Octets: (52)< >(657) method (2) Detect Time (273985) us Another example of computer code or instructions based on which particular applications can be detected within the packets 180, can include:

Check APP Protocol(0) - Not Found
Check IP Protocol(189) - Not Found APP[Zoom]
Flow: app[Zoom](1) cat[Conference](1) seq:584 [52.84.151.27] : 443<>[172.18.0.14] :
38292 proto: TCP packets: (0)<>(1) Octets: (0)<>(60) method(3) Detect Time(0)us Another example of computer code or instructions based on which particular applications can be detected within the packets 180, can include:

Check APP Protocol(0) - Not Found
Check IP Protocol(125) - Not Found APP[Microsoft Teams]
Flow: app[Microsoft Teams](2) cat[Conference](1) seq:1149 [52.113.194.132] :
443<>[172.18.0.14] : 53278 proto:TCP packets: (0)<>(1) Octets: (0)<>(60) method(3)
Detect Time(Ohne Another example of computer code or instructions based on which particular applications can be detected within the packets 180, can include:

Check APP Protocol(91) - Not Found
Check IP Protocol - Not Found
Check Host Name[n.cg.163.com] - Found APP[NetEase Cloud Game]
Flow: app[NetEase Cloud Game](5) cat[Game](3) seq:56 [52.223.63.144] :
443<>[172.18.0.14] : 46436 proto: TCP packets: (1)<>(3) Octets: (52)<>(657) method(4)
Detect Time(72176)us The technical solutions can add machine learning (ML) algorithm in APP protocol detection (e.g., rule based). The ML algorithm can include a model (e.g., neural network model, large language model, rule based model or any other) which can be trained using contents of various packets, including data, instructions, entries or settings that can be indicative of the application to be detected or identified. The ML model can be trained to detect or identify the application or category of the application from network packet headers or payloads corresponding to handshakes, application layer, network layer or any other layer of OSI that can be indicative of a feature of the applications 106 or 156. The ML algorithm can be configured to provide identification, indication or detection of the application or its category in response to a packet input into the ML model.

In some aspects, the technical solutions are directed to a system, such as a system described in connection with FIGS. 1-8. The system can include a transmitter 120 of a source device 104 or 102, providing access to an application 106 or 156. Transmitter 120 can be configured to detect an IP protocol (IP) session of a first packet 180 to be transmitted from the source device. Transmitter 120 can be configured to detect a category of an application from the first packet 180 to be transmitted from the source device. Transmitter 120 can be configured to determine a quality of service (QOS) for the application based at least on the category of the application. Transmitter 120 can be configured to mark the first packet 180 with a marker corresponding to the QoS. Transmitter 120 can be configured to schedule transmission of the first packet 180 based at least on the QoS to an destination device.

The system can include a receiver 110 of the source device 104 or 104. Receiver 110 can be configured to associate a second packet 180 received from the destination device with the first packet 180 in the same internet protocol (IP) session. Receiver 110 can be configured to identify the QoS set by the transmitter using the marker of the first packet 180 received from the transmitter. Receiver 110 can be configured to apply the identified QoS to the reception processing of the second packet 180.

The system can include transmitter 120 configured to parse a payload of an application of the first packet 180 and detect the category of the application according to the identified portion of the payload. Transmitter 120 can be configured to parse a header of a packet 180 for establishing a secured connection between the source device and the destination device and detect the category of the application according to the header. Transmitter 120 can be configured to identify an attribute of a session of the application, form the marker indicative of the attribute, and insert the marker into a header of a network layer of the first packet 180. The marker can be configured to cause a network routing the first packet 180 between transmitter 120 and receiver 110 to provide the QoS processing to the first packet 180 according to the attribute.

Receiver 110 can be configured to identify an internet protocol (IP) protocol session for the first packet 180 according to the IP header fields of the first packet 180. Receiver 110 can be configured to associate the second packet 180 received by the receiver with the identified session according the fields used for the identification of the session. Receiver 110 can be configured to apply the QoS for the first packet 180 to the queuing and forwarding priority of the second packet 180.

Receiver 110 can be configured to receive a first packet 180 transmitted from a source device based at least on a quality of service (QOS) set by the source device, identify a marker of the first packet 180 and identify the QoS set by the source device based at least on the marker. Receiver 110 can be configured to associate the first packet 180 with a second packet 180 to be transmitted from the destination device in the same internet protocol (IP) session, mark the second packet 180 to be transmitted from the destination device to the source device using the marker of the first packet 180 and schedule transmission of the second packet 180 based at least on the QoS determined based at least on the marker.

Receiver 110 can be configured to identify the marker from a header of a network layer of the first packet 180, detect an internet protocol (IP) session of the first packet 180 according to the IP header fields of the first packet 180, and select for marking the second packet 180 to be transmitted from the destination device that is in the identified session according to the IP header fields used for the identification of the session.

Receiver 110 can be configured to parse a header of a network layer of the first packet and identify the QoS for the first packet 180 and the second packet 180 based at least on the marker in the header. The receiver can be configured to identify an application of the transmitter of the first packet 180 and select for marking the second packet 180 of an application of the receiver corresponding to the application of the transmitter. At least one of the application of the transmitter or the application of the receiver can include a video conferencing application or a gaming application.

In one example, an aspect of the technical solution can include a transmitter 120 of the source device 104 at the source side 102 detecting or identifying a session of a first packet 180 to be transmitted from the source device. The transmitter 120 can identify or detect the category of the application that generated the first packet 180. Upon detecting or identifying the category, the transmitter 120 can then identify, select or determine the QoS for the packets 180 of the session or application of the first packet 180 based on an identified application category and can mark the first packet 180 according to the QoS of the session or the application. The first packet 180 can be transmitted along with other upstream packets of the given session to the destination side 152.

Across the network 101, destination side 152 can use the QoS to process the first packet 180 according to the QoS determined from the mark of the first packet 180. Transmitter 170 of the destination side 152 can identify a second packet 180 to be transmitted back to the source side 102 along with downstream packets and can use the same mark used on the first packet 180 to mark the second packet 180 in order to identify the same QoS for the downstream packets (e.g., including the second packet 180).

Upon receiving the second packet 180 at the source side 102, the receiver 110 of the source side 102 can associate the received second packet 180 (e.g., along with the downstream network traffic form the destination side 152) with the same session or application of the first packet 180. The receiver 110 of the source side 102 can determine that the mark in the second packet 180 corresponds to the same QoS or category of the session or application as the mark of the first packet 180. In response to this determination, the source side 102 can process the second packet 180 (e.g., and other downstream packets) according to the QoS marked in the second packet 180 and can use the same mark for marking future upstream packets of the same session to maintain the QoS in the next upcoming transmission to the destination side 152.

Figure 9:
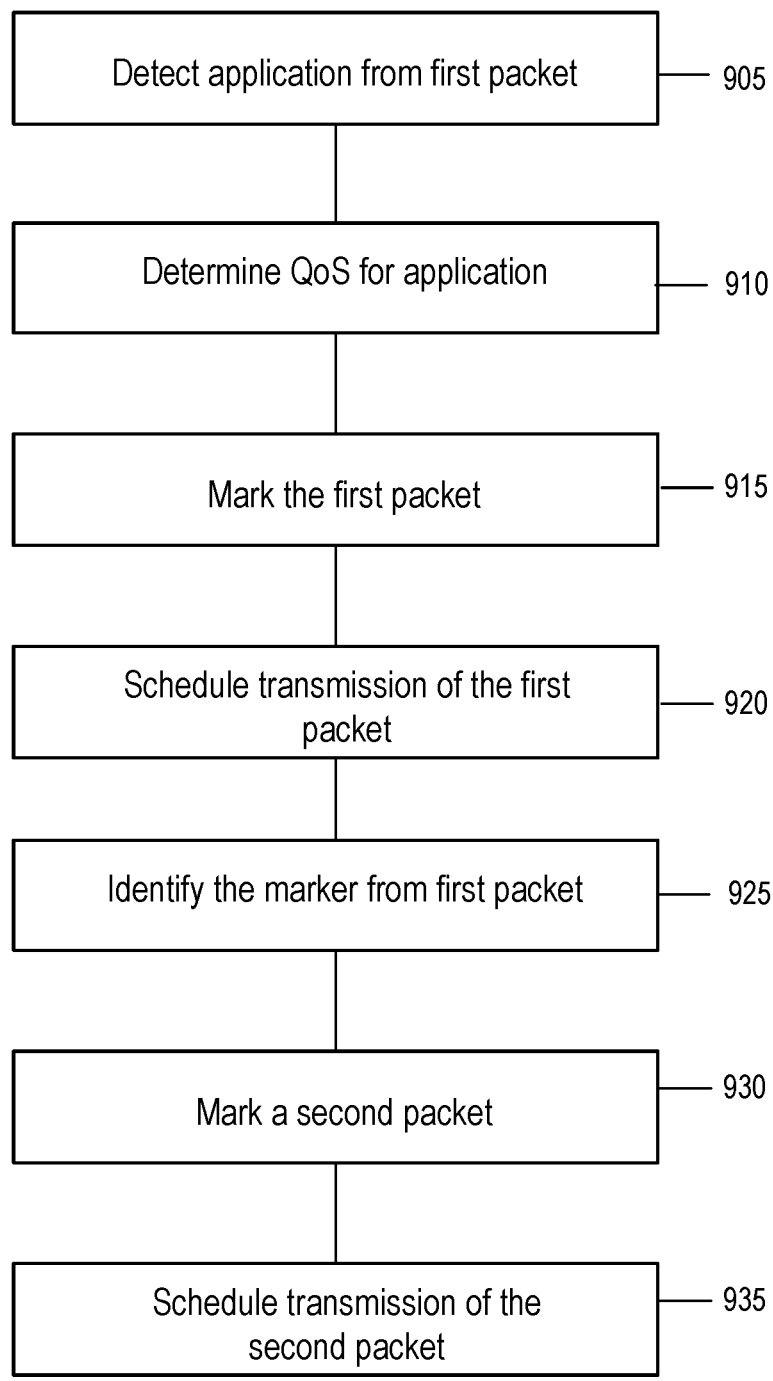
FIG. 9 illustrates an example flow of a method for application category detection and marking of packets for upstream and downstream QoS service and delivery.

FIG. 9 is an example flow diagram of a method 900 method for application category detection and marking of packets for upstream and downstream QoS service and delivery. Method 900 can include acts 905 through 935 that can be implemented, for example, using a combination of example systems and flow diagrams discussed in connection with FIGS. 1-8. For example, at 905, an application is detected from a first packet. At 910, QOS is determined for the identified application. At 915, the first packet is marked. At 920, transmission of the first packet is scheduled. At 925, the marker from the first packet is identified. At 930, a second packet is marked. At 935, transmission of the second packet is scheduled.

At 905, an application is detected from a first packet. The method can include a transmitter of a source device providing access to an application detecting a category of an application from a first packet to be transmitted from the source device. The method can include the transmitter detecting an IP protocol (IP) session of a first packet to be transmitted from the source device. The source device can include an application source device executing an application (e.g., a user smartphone, game console or a computer). The transmitter can be separate from a source device (e.g., coupled via wireless communication with the source device), or can be integrated with (e.g., internal to) the source device.

The transmitter can detect a category of the application executed by the source device using the first packet of the application to be transmitted by the transmitter on the source side towards a receiver on a remote destination side. The method can include the transmitter parsing a payload of an application of the first packet, such as for example a payload of an application. The transmitter can parse a header of a network packet. For example, transmitter can parse an application layer header, a presentation layer header, a session layer header, a transport layer header or a network layer header. The method can include parsing a payload of header of a packet for establishing a secured connection between the source device and the destination device, such as a packet for a handshake for establishing encryption.

The method can include a category detector identifying the application and determining a category of an application for a QoS setting. The category detector can parse the first packet (e.g., header or payload) and determine from the contents of the first packet information identifying application. The information can include a hostname of a server corresponding to the application, an IP address corresponding to an application, a name of the application or any other indicator of the application. Once application is identified, the category detector can use a lookup table to identify the category for the application and/or QoS service for the application.

At 910, QOS is determined for the identified application. The method can include the transmitter determining a quality of service (QOS) for the application based at least on the category of the application. The method can include a QoS setting or specification to apply with respect to the application based on the category of the application. For example, category detector can select a QoS setting for the first packet (e.g., and other subsequent packets for the session of the application) based at least on a lookup table identifying the QoS setting for a particular category of the application.

The method can include the transmitter detecting the category of the application according to the identified portion of the payload. For example, the transmitted can detect the category of application based at least one a portion of a header or a payload of the first packet identifying the application. The transmitter can detect the category of the application according to the header (e.g., network layer header, transport layer header, session layer header, presentation layer header or application layer header).

The method can include identifying an attribute of a session of the application. For example, in response to identifying the application, the transmitter can detect a session of the application. The transmitter can detect one or more attributes of the session, such as a particular desired latency range, bandwidth range, security or encryption specification, jitter limitations or any other specifications for network traffic processing. The attribute of the session can be used by the transmitter to detect or identify the category of the application and the QoS for the first packet.

The method can include the receiver of the source side (e.g., application source device) receiving a downstream data including a third packet. The method can include parsing, by the receiver, a header of a network layer of the received third packet. The method can include identify the QoS to use for a fourth packet in the upstream transmission for the destination side based at least on the marker identified in the header of the third packet. For example, the marker of the third packet can be inserted or copied into the header (e.g., network layer or transport layer header) of the fourth packet to ensure the same QoS for the fourth packet as for the third and second and first packets.

At 915, the first packet is marked. The method can include the transmitter marking the first packet with a marker corresponding to the QoS. The transmitter can generate the marker for the first packet based at least one the category of the application. The packet maker can include information indicative of the QoS to be performed on the first packet by one or more devices on the network and the destination side (e.g., receivers, application destination devices, routers and/or servers)

The method can include the transmitter selecting, generating or forming the marker indicative of the attribute of the session of the application. For example, the transmitter can generate the marker based at least on (e.g., to accommodate) the specifications of the network identified in the attributes of the session of the application. For example, the transmitter can select the marker for the given session or the application of the session from a table, database, file or selection of markers corresponding to different QoSs for different types of applications.

The method can include the transmitter inserting the marker into a header of a network layer of the first packet. The marker can be configured to cause a network routing the first packet between the transmitter and the receiver to provide the QoS processing to the first packet according to the attribute. The receiver can include inserting the marker into a header of a network layer of the second packet to cause a network routing the first packet between the receiver and the transmitter to provide the QoS processing to the second packet according to an attribute of a session of the application determined by the transmitter.

At 920, transmission of the first packet is scheduled. The method can include the transmitter scheduling transmission of the first packet based at least on the QoS to a destination device. For example, the transmitter can implement the QoS settings by scheduling the transmission of the first packet according to the priority of the first packet. For example, the first packet can be assigned to a high priority based on QoS determined based on the category of the application. In response to the first packet being assigned a high priority, the first packet can be transmitted ahead of other packets in the queue.

At 925, the marker from the first packet is identified. The method can include a receiver of the destination device identifying the QoS set by the transmitter using the marker of the first packet received from the transmitter. For example, the receiver of the destination side can receive the first packet via the network and within the upstream transmission from the source side. The receiver can parse the first packet. For example, the receiver can parse the network layer or transport layer of the first packet and identify the packet marker. Based on the packet marker content the receiver can identify the QoS of the first packet.

The receiver can identify a session according to the first packet. For example, the receiver at the destination side can identify a session of an application at an application destination, according to identifier of the application in the first packet. The packet marker can include, for example, an identifier or data corresponding to the session of the application. The receiver can identify the session according to payload of the first packet, the header of the first packet or the first marker of the first packet.

The method can include the receiver of the source device associating a second packet received from the destination device with the first packet in the same IP session. The receiver of the source device can identify the QoS set by the transmitter using the marker of the first packet received from the transmitter. The receiver of the source device can apply the identified QoS to the reception processing of the second packet.

The receiver can identify an IP session corresponding to the first packet according to the IP header fields of the first packet. The receiver can associate the second packet received by the receiver with the identified session according to one or more fields used for the identification of the session. The receiver can apply the QoS for the first packet to the queueing and forwarding priority of the second packet.

At 930, a second packet is marked. The method can include the receiver marking a second packet to be transmitted from the destination device to the source device using the marker of the first packet. The second packet can be marked using the same marker from the first packet. For example, the receiver can identify that the first packet from the application source destined for the application destination and the second packet from the application destination destined for the application source belong or correspond to the same session (e.g., a session between the application at the application source and the application at the application destination). In response to identifying that the second packet and the first packet correspond to the same session of the application, the receiver at the destination side can insert or copy the packet marker of the first packet into the second packet.

At 935, transmission of the second packet is scheduled. The method can include the receiver (e.g., of the destination side) scheduling transmission of the second packet based at least on the QoS to the transmitter (e.g., of the source side). The receiver can transmit the second packet of the identified session according to a schedule determined based at least on the QoS set by the transmitter of the source side.

For example, the transmitter of the destination side (e.g., server side) can transmit to the receiver of the source side (e.g., user side) the second packet in accordance with the QoS setup or established by the transmitter of the source side. The transmitter of the destination side can prioritize the second packet according to the priority of the first packet at the transmitter of the source side.

The transmitter of the source side can identify a third packet of a first session of the source device corresponding to the first packet. The transmitter of the source side can identify the third packet from the application of the application source following the receipt of the second packet from the destination side. The transmitter can mark, responsive to the identifying, the third packet with the marker of the received second packet. The transmitter of the source side can schedule the transmission of the third packet based at least on the QoS. The receiver of the destination side can identify a fourth packet of a second session of the destination device. The fourth packet can be a packet of the application at the application destination. The fourth packet can be identified following the receipt of the third packet from the source side. The receiver of the destination side can mark the fourth packet to be transmitted from the destination device to the source device using the marker of the third packet. The receiver of the destination side can schedule transmission of the fourth packet based at least on the QoS.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first packet and a second packet) temporally or according to a sequence, although in some cases, these entities can include such a relationship. Nor do these terms limit the number of possible entities (e.g., transmitters and receivers) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
   a transmitter of a source device providing access to an application, the transmitter configured to:
      detect a category of an application from a first packet to be transmitted from the source device;
      determine a quality of service (QOS) for the application based at least on the category of the application;
      mark the first packet with a marker corresponding to the QoS;
      schedule transmission of the first packet based at least on the QoS to an destination device; and
   a receiver of the destination device, the receiver configured to:
      identify the QoS set by the transmitter using the marker of the first packet received from the transmitter;
      mark a second packet to be transmitted from the destination device to the source device using the marker of the first packet; and
      schedule transmission of the second packet based at least on the QoS to the transmitter.

2. The system of claim 1, wherein the transmitter is configured to:
   parse a payload of an application of the first packet; and
   detect the category of the application according to an identified portion of the payload.

3. The system of claim 1, wherein the transmitter is configured to:
   parse a header of a packet for establishing a secured connection between the source device and the destination device;
   detect the category of the application according to the header.

4. The system of claim 1, wherein the transmitter is configured to:
   identify an attribute of a session of the application;
   select the marker indicative of the attribute; and
   insert the marker into a header of a network layer of the first packet, wherein the marker is configured to cause a network routing of the first packet between the transmitter and the receiver to provide the QoS processing to the first packet according to the attribute.

5. The system of claim 1, wherein the receiver is configured to:
   parse a header of a network layer of the first packet; and
   identify the QoS based at least on the marker in the header.

6. The system of claim 1, wherein the receiver is configured to:
   insert the marker into a header of a network layer of the second packet to cause a network routing the first packet between the receiver and the transmitter to provide the QoS processing to the second packet according to an attribute of a session of the application determined by the transmitter.

7. The system of claim 1, wherein the receiver is configured to:
   identify a session according to the first packet; and
   transmit the second packet of the identified session according to a schedule determined based at least on the QoS set by the transmitter.

8. A system comprising:
   a transmitter of a source device providing access to an application, the transmitter configured to:
      mark a first packet with a marker corresponding to quality of service (QoS) determined based on a category of the application; and
   a receiver of a destination device, the receiver configured to:
      receive the first packet from the source device based at least on the QoS set by the source device;
      identify the marker of the first packet;
      identify the QoS set by the source device based at least on the marker;
      mark a second packet to be transmitted from the receiver to the source device using the marker of the first packet; and
      schedule transmission of the second packet based at least on the QoS determined based at least on the marker.

9. The system of claim 8, wherein the receiver is configured to:
   identify the marker from a header of a network layer of the first packet;
   detect a session of the first packet according to the marker; and
   select for marking the second packet of the session.

10. The system of claim 8, wherein the receiver is configured to:
    parse a header of a network layer of the first packet; and
    identify the QoS for the first packet and the second packet based at least on the marker in the header.

11. The system of claim 8, wherein the receiver is configured to:
  identify the application of the transmitter of the first packet; and
  select for marking the second packet of an application of the receiver corresponding to the application of the transmitter.

12. The system of claim 8, wherein at least one of the application of the transmitter or an application of the receiver includes a video conferencing application or a gaming application.

13. A method comprising:
  detecting, by a transmitter of a source device providing access to an application, a category of an application from a first packet to be transmitted from the source device;
  determining, by the transmitter, a quality of service (QOS) for the application based at least on the category of the application;
  marking, by the transmitter, the first packet with a marker corresponding to the QOS;
  scheduling, by the transmitter, transmission of the first packet based at least on the QoS to an destination device;
  identifying, by a receiver of the destination device, the QoS set by the transmitter using the marker of the first packet received from the transmitter;
  marking, by the receiver, a second packet to be transmitted from the destination device to the source device using the marker of the first packet; and
  scheduling, by the receiver, transmission of the second packet based at least on the QoS to the transmitter.

14. The method of claim 13, comprising:
  parsing, by the transmitter, a payload of an application of the first packet; and
  detecting, by the transmitter, the category of the application according to an identified portion of the payload.

15. The method of claim 13, comprising:
  parsing, by the transmitter, a header of a packet for establishing a secured connection between the source device and the destination device; and
  detecting, by the transmitter, the category of the application according to the header.

16. The method of claim 13, comprising:
  identifying, by the transmitter, an attribute of a session of the application;
  selecting, by the transmitter, the marker indicative of the attribute; and
  inserting, by the transmitter, the marker into a header of a network layer of the first packet, wherein the marker is configured to cause a network routing of the first packet between the transmitter and the receiver to provide the QoS processing to the first packet according to the attribute.

17. The method of claim 13, comprising:
  parsing, by the receiver, a header of a network layer of the first packet; and
  identify the QoS based at least on the marker in the header.

18. The method of claim 13, comprising:
  inserting, by the receiver, the marker into a header of a network layer of the second packet to cause a network routing the first packet between the receiver and the transmitter to provide the QoS processing to the second packet according to an attribute of a session of the application determined by the transmitter.

19. The method of claim 13, comprising:
  identifying, by the receiver, a session according to the first packet; and
  transmitting, by the receiver, the second packet of the identified session according to a schedule determined based at least on the QoS set by the transmitter.

20. The method of claim 13, comprising:
  identifying, by the transmitter, a third packet of a first session of the source device corresponding to the first packet;
  marking, by the transmitter responsive to the identifying, the third packet with the marker;
  scheduling, by the transmitter, transmission of the third packet based at least on the QoS;
  identifying, by the receiver, a fourth packet of a second session of the destination device;
  marking, by the receiver, the fourth packet to be transmitted from the destination device to the source device using the marker of the third packet; and
  scheduling, by the receiver, transmission of the fourth packet based at least on the QoS.

* * * * *